United States Patent
Chun et al.

(10) Patent No.: US 12,213,056 B2
(45) Date of Patent: Jan. 28, 2025

(54) COMMUNICATION ASSOCIATED WITH ACCESS CONTROL

(71) Applicant: LG ELECTRONICS INC., Seoul (KR)

(72) Inventors: Sungduck Chun, Seoul (KR); Sangmin Park, Seoul (KR)

(73) Assignee: LG ELELCTRONICS INC., Seoul (KR)

( * ) Notice: Subject to any disclaimer, the term of this patent is extended or adjusted under 35 U.S.C. 154(b) by 377 days.

(21) Appl. No.: 17/758,418

(22) PCT Filed: Jan. 4, 2021

(86) PCT No.: PCT/KR2021/000017
§ 371 (c)(1),
(2) Date: Jul. 26, 2022

(87) PCT Pub. No.: WO2021/141334
PCT Pub. Date: Jul. 15, 2021

(65) Prior Publication Data
US 2023/0049846 A1      Feb. 16, 2023

(30) Foreign Application Priority Data

Jan. 7, 2020  (KR) .................. 10-2020-0001799

(51) Int. Cl.
*H04W 48/10*   (2009.01)
*H04W 4/70*    (2018.01)

(52) U.S. Cl.
CPC .............. *H04W 48/10* (2013.01); *H04W 4/70* (2018.02)

(58) Field of Classification Search
CPC ....... H04W 48/10; H04W 4/70; H04W 48/02; H04W 48/14; H04W 4/44
(Continued)

(56) References Cited

U.S. PATENT DOCUMENTS

2014/0206373 A1* 7/2014 Ljung ................. H04W 72/23
                                                            455/452.1
2015/0049608 A1* 2/2015 Palm .................... H04W 76/10
                                                            370/230
(Continued)

FOREIGN PATENT DOCUMENTS

| WO | 2017-171184 | 10/2017 |
| WO | 2018-203263 | 11/2018 |

OTHER PUBLICATIONS

PCT International Application No. PCT/KR2021/000017, International Search Report dated Apr. 8, 2021, 4 pages.
(Continued)

*Primary Examiner* — Don N Vo
(74) *Attorney, Agent, or Firm* — LEE, HONG, DEGERMAN, KANG & WAIMEY

(57) ABSTRACT

A disclosure of the present specification provides a method for performing, by a UE, communication associated with access control. The method may comprise the steps of: acquiring information associated with exception data; determining an access category of an access attempt for the exception data, on the basis of the information associated with the exception data; performing an access control check on the basis of the determined access category; and, when access is allowed according to the access control check, transmitting the exception data.

11 Claims, 16 Drawing Sheets

(58) Field of Classification Search
USPC .................................................... 455/435.1
See application file for complete search history.

(56) References Cited

U.S. PATENT DOCUMENTS

| | | | |
|---|---|---|---|
| 2015/0119060 A1* | 4/2015 | Aoyagi | H04W 48/04 |
| | | | 455/452.1 |
| 2018/0213466 A1 | 7/2018 | Kotecha et al. | |
| 2018/0249384 A1* | 8/2018 | Chami | H04W 36/0077 |
| 2019/0059121 A1 | 2/2019 | Takeda et al. | |
| 2019/0320443 A1* | 10/2019 | Wang | H04W 72/535 |
| 2021/0409934 A1* | 12/2021 | Tiwari | H04W 8/24 |

OTHER PUBLICATIONS

Qualcomm Inc., "UAC for NB-IOT," S1-193529, 3GPP TSG-SA WG1 Meeting #88, Nov. 2019, 4 pages.

* cited by examiner

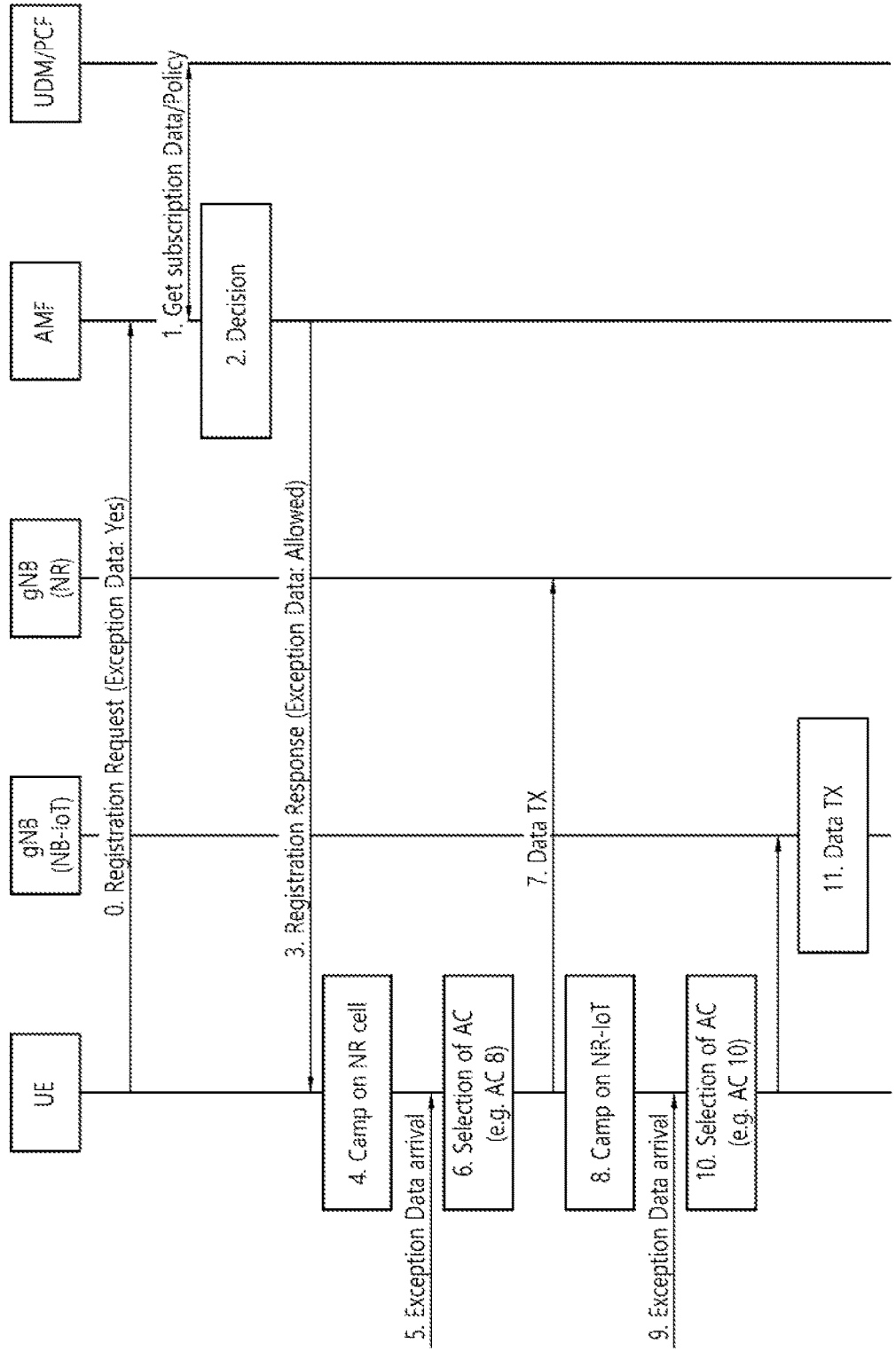

COMMUNICATION ASSOCIATED WITH
ACCESS CONTROL

CROSS-REFERENCE TO RELATED
APPLICATIONS

This application is the National Stage filing under 35 U.S.C. 371 of International Application No. PCT/KR2021/000017, filed on Jan. 4, 2021, which claims the benefit of earlier filing date and right of priority to Korean Application No. 10-2020-0001799, filed on Jan. 7, 2020, the contents of which are all hereby incorporated by reference herein in their entireties.

TECHNICAL FIELD

The present specification relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, in 5G, unified access control is introduced. In unified access control, access categories with different priorities are used. However, in the prior art, a method of effectively using an access category has not been discussed. For example, since an effective method for determining an access category has not been defined in the prior art, there is a problem in that the terminal arbitrarily uses an access category having a high priority, thereby increasing the load of the system.

SUMMARY

Accordingly, a disclosure of the present specification has been made in an effort to solve the aforementioned problem.

In order to solve the above problems, one disclosure of the present specification provides a method for a UE to perform access control related communication. The method includes: obtaining information related to exception data; determining an access category of an access attempt for the exception data based on information related to the exception data; performing an access control check based on the determined access category; and if access is permitted according to the access control check, transmitting the exception data.

In order to solve the above problems, one disclosure of the present specification provides a method for a network node to perform access control related communication. The method includes: receiving a registration request message from the UE including information requesting to allow use of exception data; determining to allow the UE to use the exception data based on the subscription information of the UE and policy information to be applied to the UE; and transmitting a registration response message including information indicating that use of the exception data is allowed to the UE.

In order to solve the above problems, one disclosure of the present specification provides a UE for performing communication related to access control. The UE includes at least one processor; and at least one memory that stores an instruction and is operably electrically connectable with the at least one processor, wherein the operation performed based on the instruction being executed by the at least one processor comprises: exception data obtaining information related to determining an access category of an access attempt for the exception data based on information related to the exception data; performing an access control check based on the determined access category; and if access is permitted according to the access control check, transmitting the exception data.

In order to solve the above problems, one disclosure of the present specification provides a network node that performs communication related to access control. The network node includes at least one processor; and at least one memory that stores an instruction and is operably electrically connectable with the at least one processor, wherein the operation performed based on the instruction being executed by the at least one processor comprises: exception data Receiving a registration request message including information requesting to allow the use of the UE from the UE; determining to allow the UE to use the exception data based on the subscription information of the UE and policy information to be applied to the UE; and transmitting a registration response message including information indicating that use of the exception data is permitted to the UE.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operation may include: obtaining information related to the exception data; determining an access category of an access attempt for the exception data based on information related to the exception data; performing an access control check based on the determined access category; and if access is permitted according to the access control check, transmitting the exception data.

In order to solve the above problems, one disclosure of the present specification provides a non-volatile computer-readable storage medium in which instructions are recorded. The instructions, when executed by one or more processors, cause the one or more processors to: obtain information related to exception data; determining an access category of an access attempt for the exception data based on information related to the exception data; performing an access control check based on the determined access category; and if access is allowed according to the access control check, transmitting the exception data.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various

BRIEF DESCRIPTION OF THE DRAWINGS

FIG. 7 shows an example of operation of a network and/or a terminal according to the disclosure of the present specification.

DESCRIPTION OF EXEMPLARY EMBODIMENTS

Figure 1:
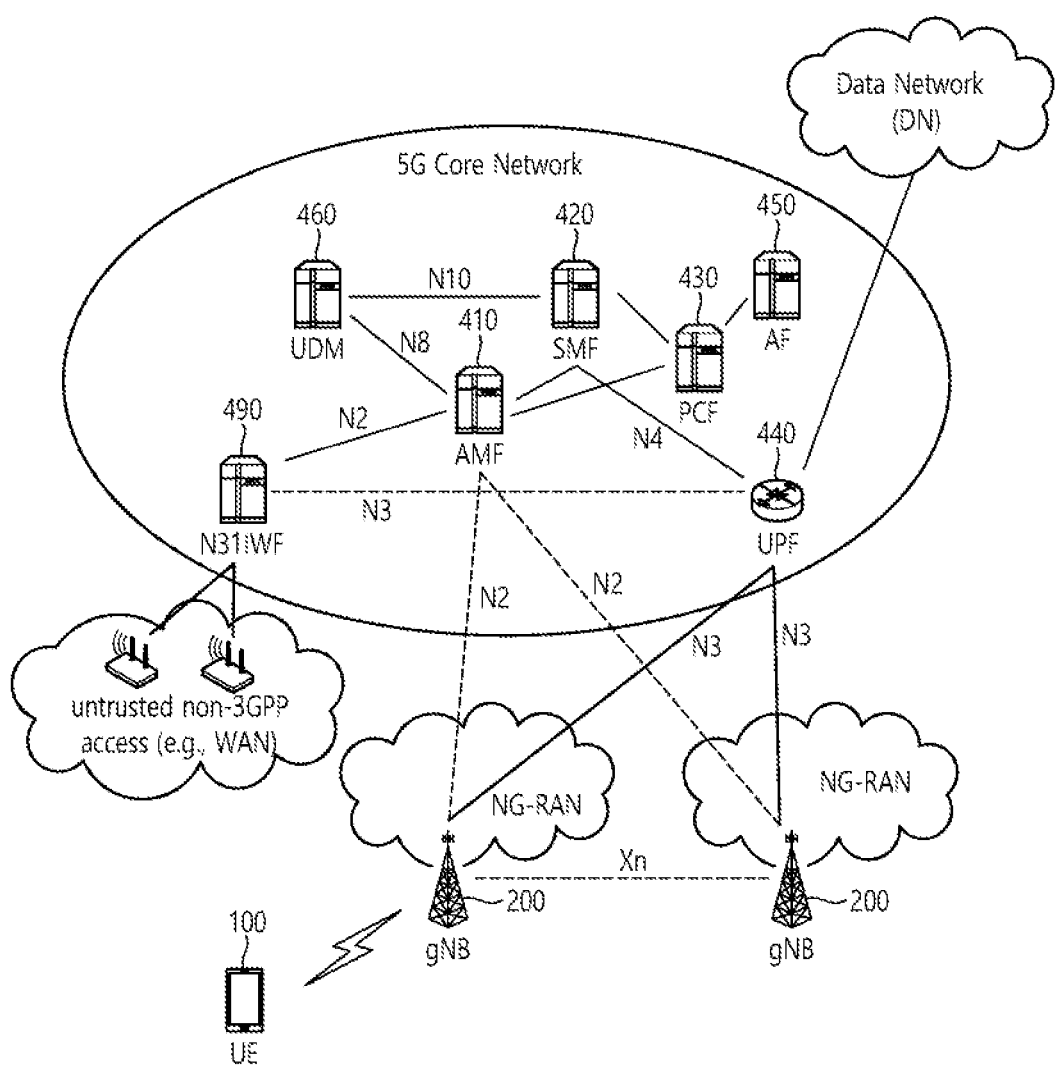
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and it may be called another term such as an evolved-NodeB (eNodeB), an evolved-NodeB (eNB), a BTS (Base Transceiver System), an access point (Access Point), gNB (Next generation NodeB), etc.

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP (3rd Generation Partnership Project) interworking function (N3IWF) 490.

A UE 100 is connected to a data network via the UPF 440 through a Next Generation Radio Access Network (NG-RAN) including the gNB 200.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 200 and the SMF 420. In addition, when the UE 100 moves over an area served by the gNB 200, the UPF 440 serves as a mobility anchor point. The UPF 440 may perform a function of handling a PDU. For mobility within the NG-RAN (which is defined after 3GPP Release-15), the UPF 440 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be called millimeter wave (mmWave).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 4100 MHz to 7125 MHz as shown in Table 2 below. That is, FR1 may include a frequency band of 6 GHZ (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Figure 2:
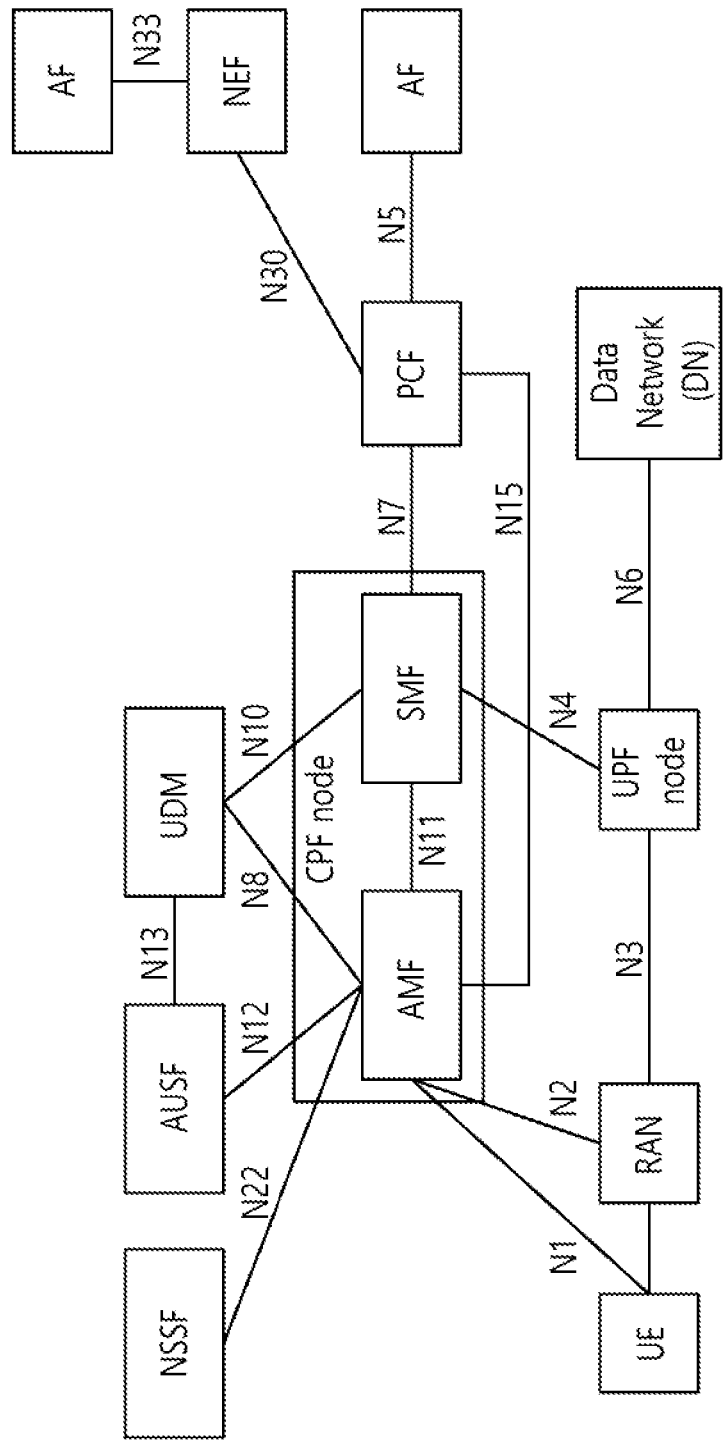
FIG. 2 is an exemplary diagram illustrating a predicted structure of a next generation mobile communication in terms of a node.

FIG. 2 is an exemplary diagram illustrating a predicted structure of a next generation mobile communication in terms of a node. Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
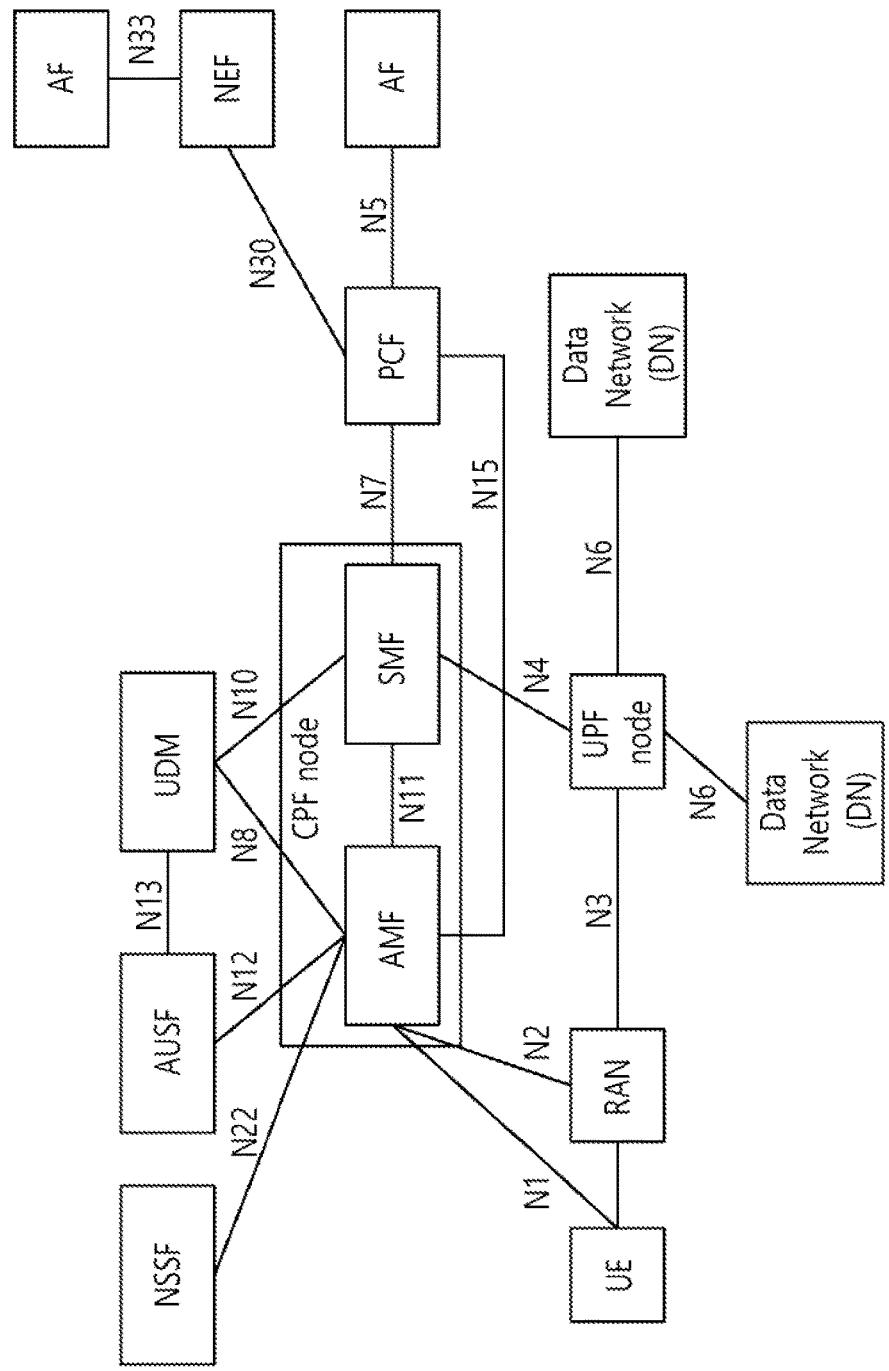
FIG. 3 is an exemplary diagram illustrating an architecture for supporting a concurrent access through two data networks.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
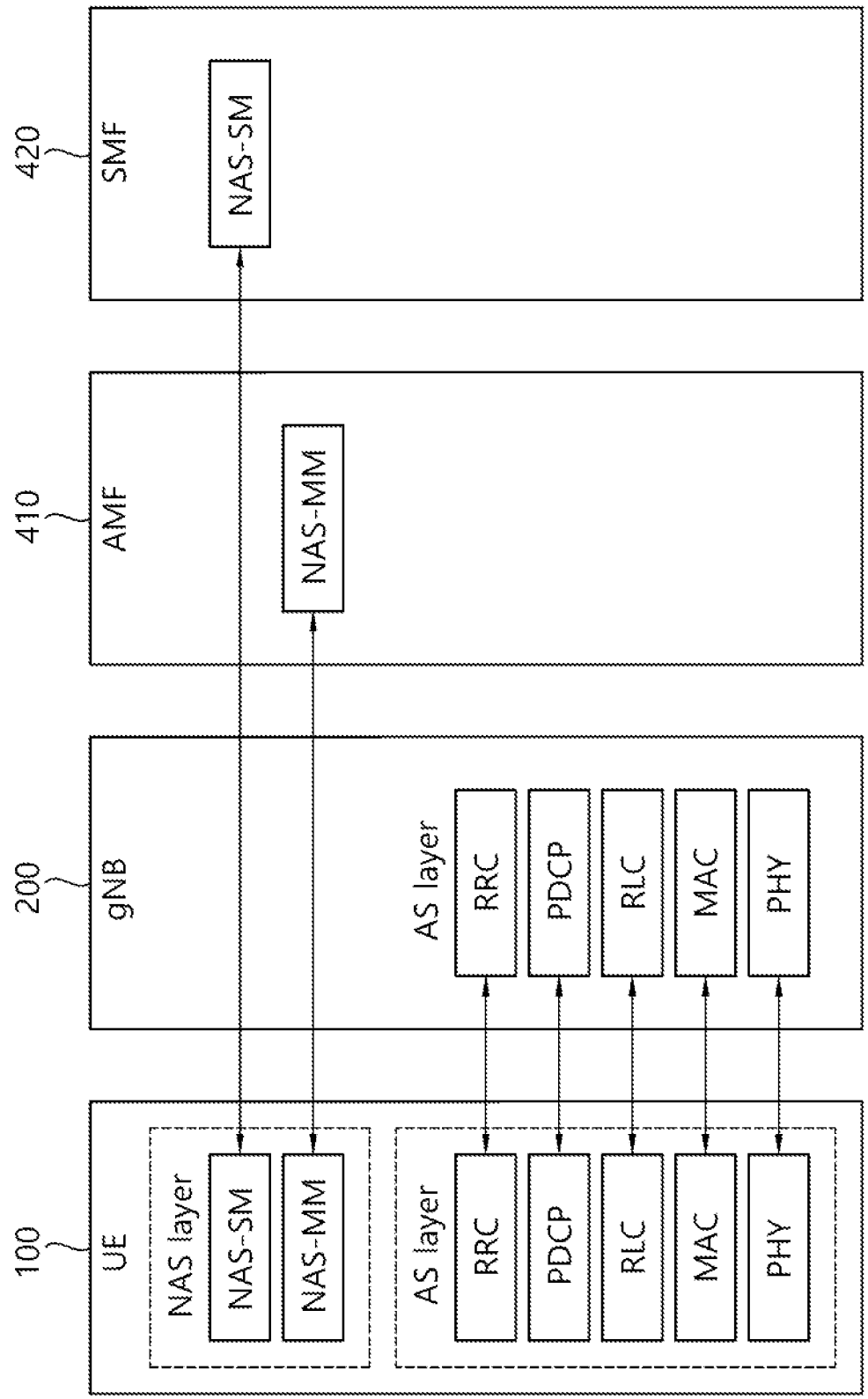
FIG. 4 is another exemplary diagram showing a structure of a radio interface protocol between a UE and a gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS Entity for MM Provides the Following Functions in General.
   NAS procedures related to AMF include the following.
   Registration management and access management procedures. AMF supports the following functions.
   Secure NAS signal connection between UE and AMF (integrity protection, encryption)

2) The NAS Entity for SM Performs Session Management Between the UE and the SMF.
   The SM signaling message is processed, that is, generated and processed, at an NAS-SM layer of the UE and SMF. The contents of the SM signaling message are not interpreted by the AMF.
   In the case of SM signaling transmission,
   The NAS entity for the MM creates a NAS-MM message that derives how and where to deliver an SM signaling message through a security header representing the NAS transmission of SM signaling and additional information on a received NAS-MM.
   Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving to a new tracking area (TA) whine the UE is in an idle mode, and when the UE needs to perform periodic registration update.

During the initial registration procedure, the ID of the UE may be obtained from the UE. AMF may deliver PEI (IMEISV) to UDM, SMF and PCF.

Figure 5A:
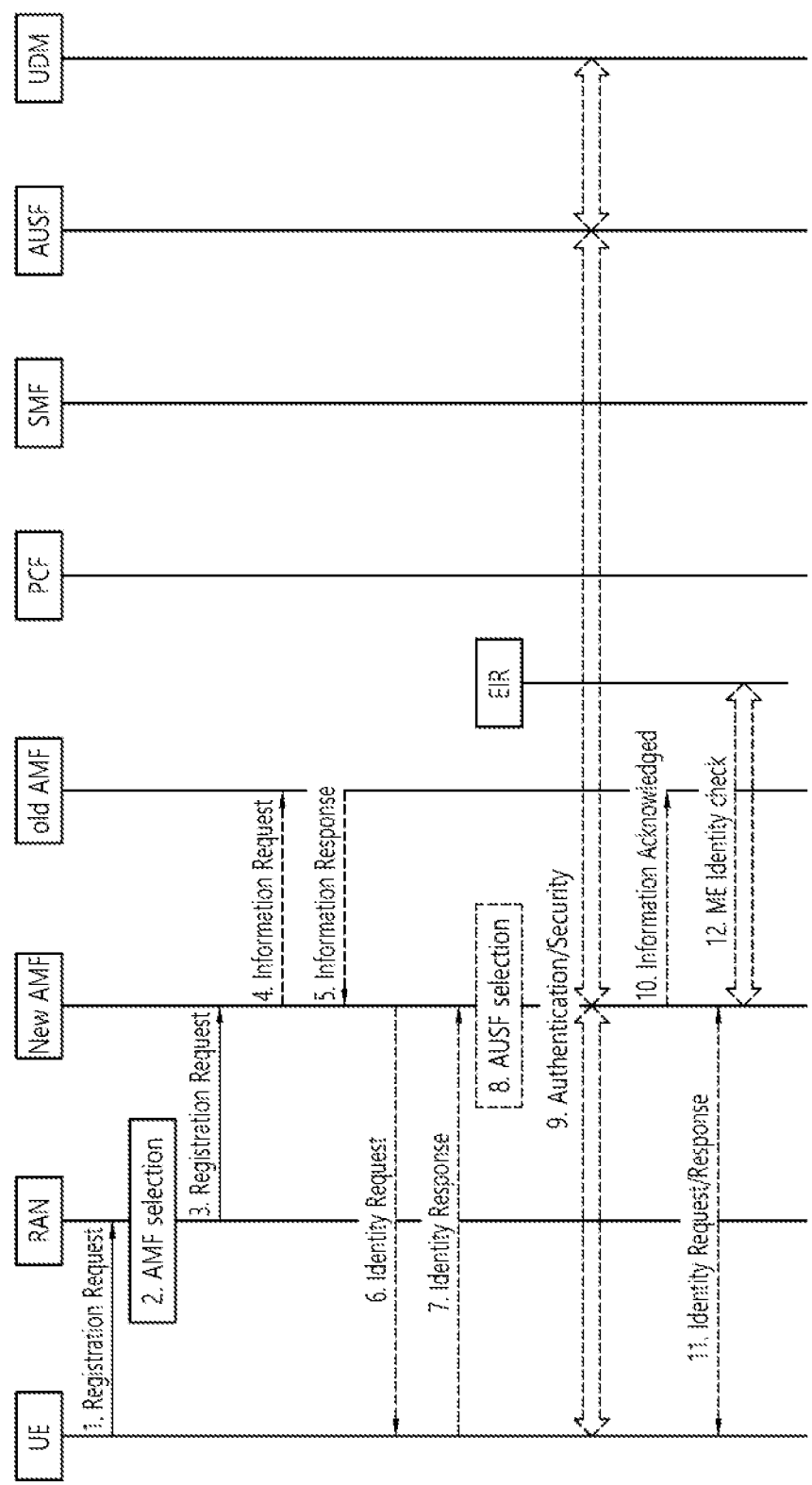
FIGS. 5a and 5b is a signal flow chart showing an exemplary registration procedure.
Figure 5B:
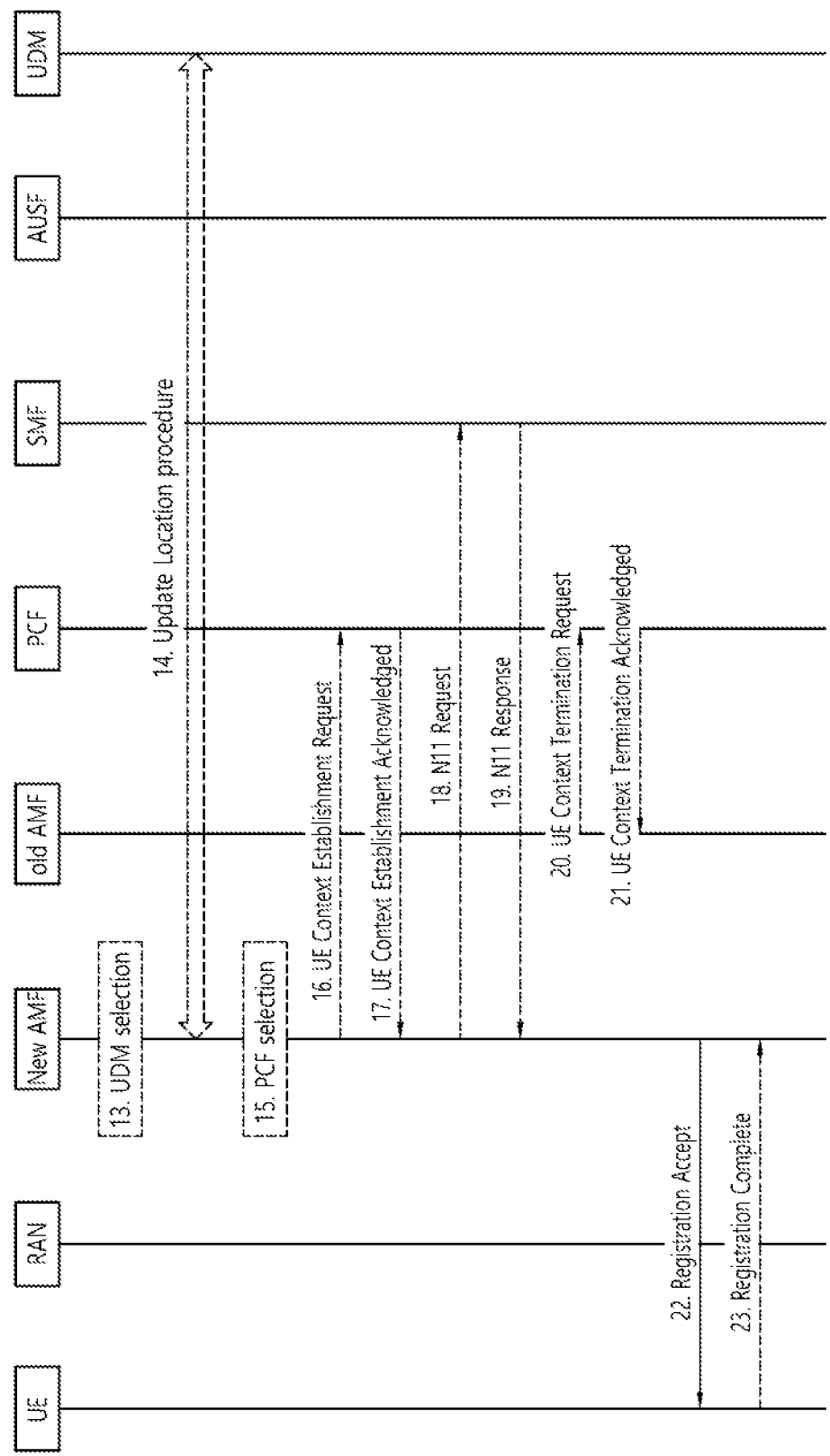

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU (protocol data unit) session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.
16) The new AMF transmits a UE Context Establishment Request message to the PCF. The AMF may request an operator policy for the UE to the PCF.
17) The PCF transmits a UE Context Establishment Acknowledged message to the new AMF.
18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.
20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.
22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI (Session Network Slice Selection Assistance Information) of the allowed NSSAI (Network Slice Selection Assistance Information) to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU (Protocol Data Unit) Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
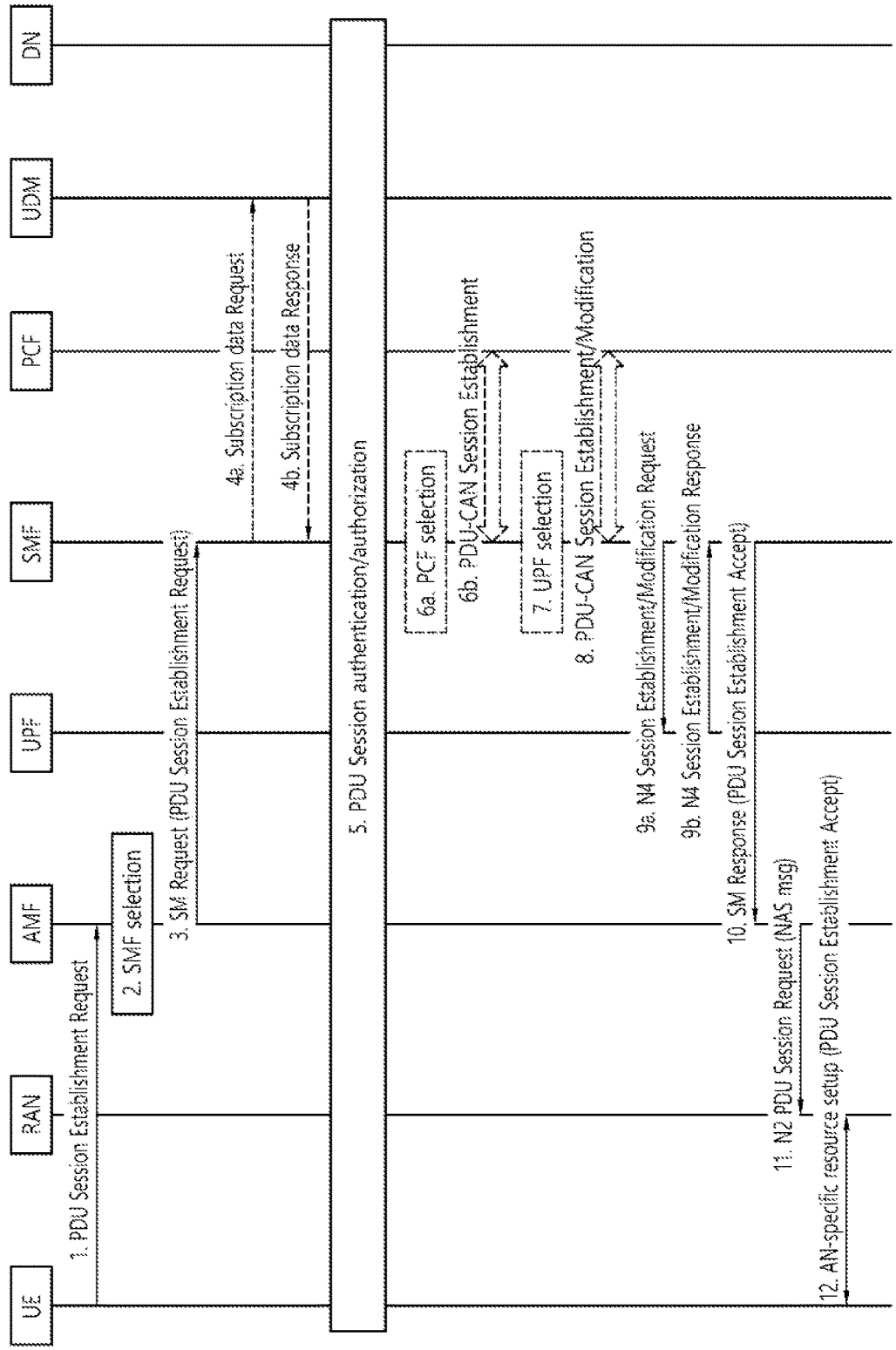
FIGS. 6a and 6b is a signal flowchart illustrating an exemplary PDU session establishment procedure.
Figure 6B:
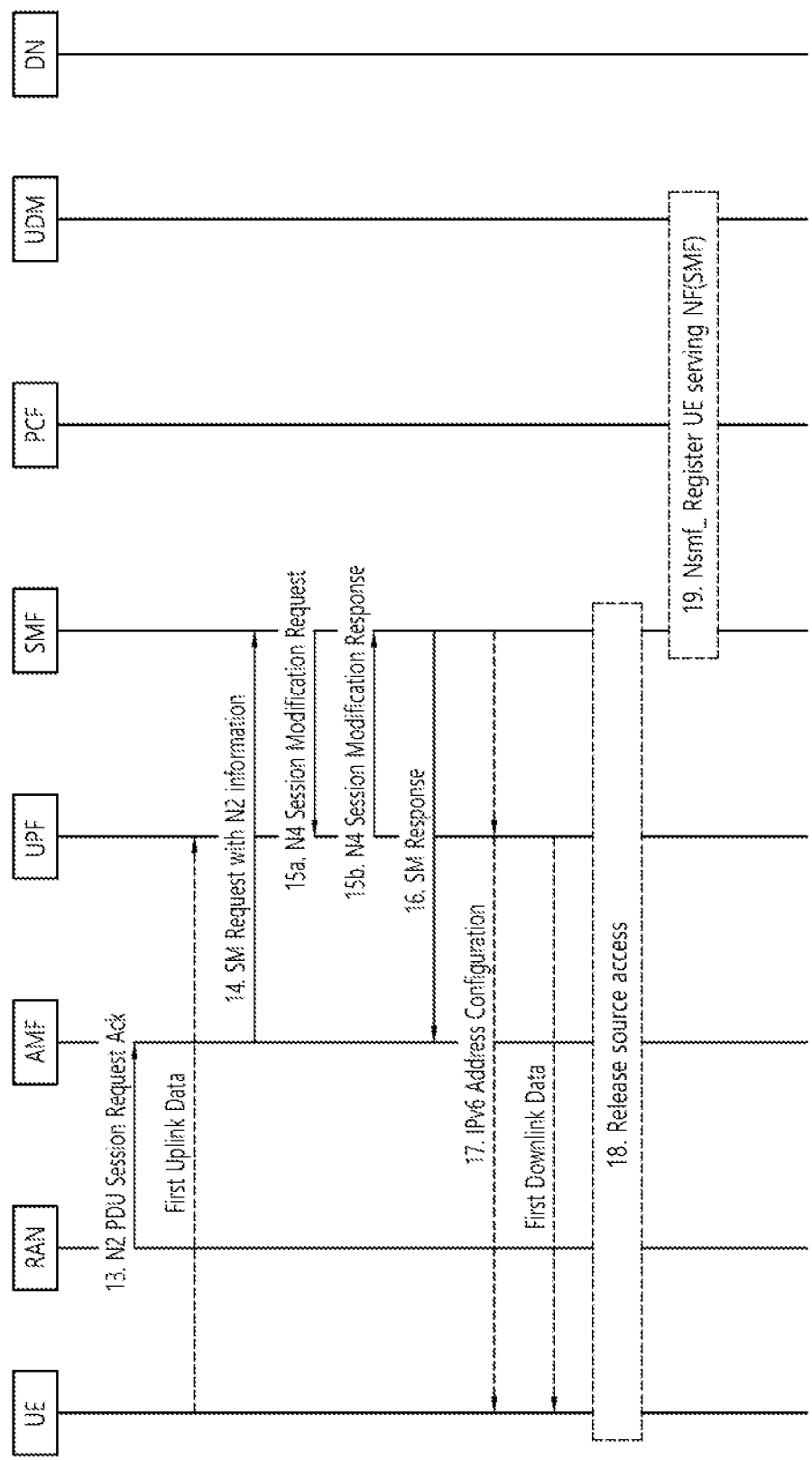

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, the UE may extract and store the information of the allowed S-NSSAI and the mapped S-NSSAI included in the registration accept message received from the network (i.e., AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QOS rules may be included in the N1 SM information and the N2 SM information within the PDU Session Establishment Accept message.

The SM response message also includes information enabling the PDU session ID and AMF to determine not only which target UE to use but also which access is to be used for the UE 11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPV6, the SMF may generate an IPV6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<Unified Access Control>

When congestion occurs in the 5G system, depending on operator policies, deployment scenarios, subscriber profiles, and available services, different criteria may be used to determine which access attempt should be allowed or blocked. These different criteria for access control relate to Access Identities and Access Categories. The 5G system can provide a single unified access control where operators control access based on access ID and access category.

In unified access control, each access attempt may be categorized into one or more access IDs and one access category. Based on the access control information available for the access ID corresponding to the access attempt and the access category corresponding to the access attempt, the terminal (e.g., UE) may test whether an actual access attempt can be made.

Unified access control supports extensibility to include additional standardized access IDs and additional standardized access categories. In addition, the unified access control supports the flexibility of an operator to define an access category using the operator's own criteria (criterion).

Based on the operator's policy, the 5G system may prevent a terminal (e.g., UE) from accessing the network by using an access ID and related barring parameters that vary depending on the access category.

Here, the access ID may be configured in the UE as in the example of Table 3 below. An access category may be defined as a combination of a UE-related condition and an access attempt type, as shown in Table 4 below. One or more access IDs and one access category may be selected and tested for access attempts.

Table 3 below shows an example of an access ID that can be configured in the UE.

TABLE 3

| Access Identitynumber | UE configuration |
|---|---|
| 0 | UE is not configured with any parameters from this table. |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1:
Access ID 1 may be used by UEs configured for MPS in PLMNs for which configuration is valid. PLMNs for which configuration is valid may be HPLMNs, PLMNs equivalent to HPLMNs, and visted PLMNs of home country. Access ID 1 may also be valid when the UE is explicitly authenticated based on the obtained PLMN established inside and outside of the UE.
NOTE 2:
Access ID 2 may be used by a UE configured for MCS in PLMNs for which configuration is valid. PLMNs for which configuration is valid may be HPLMNs, PLMNs equivalent to HPLMNs, and visited PLMNs of home country. Access ID 2 may also be valid when the UE is explicitly authenticated based on the obtained PLMN established inside and outside of its own country.
NOTE 3:
Access IDs 11 and 15 may be valid in the Home PLMN when an Equivalent HPLMN (EHPLMN) list does not exist, or may be valid in any EHPLMN. Access IDs 12, 13 and 14 can only be valid in their Home PLMN and visited PLMNs. To this end, a home country may be defined as a country of a mobile country code (MCC) part of an international mobile subscriber identity (IMSI).

Table 4 below shows examples of access categories that can be defined by a combination of conditions related to the UE and types of access attempts.

TABLE 4

| Access Category number | Conditions related to UE | Type of access attempt |
|---|---|---|
| 0 | All | MO(Mobile Originating) signaling resulting from paging |
| 1 (NOTE 1) | The UE is configured for a delay tolerant service, and may be a target of access control for access category 1 (a target of access control determined according to the relationship between the | All except for Emergency |

TABLE 4-continued

| Access Category number | Conditions related to UE | Type of access attempt |
|---|---|---|
| | HPLMN of the UE and the selected PLMN). | |
| 2 | All | Emergency |
| 3 | All except the conditions of access category 1 | NAS level MO signaling due to non-paging |
| 4 | All except the conditions of access category 1 | MMTEL(multimedia telephony) voice (NOTE 3) |
| 5 | All except the conditions of access category 1 | MMTEL video |
| 6 | All except the conditions of access category 1 | SMS |
| 7 | All except the conditions of access category 1 | MO data that does not belong to any other access category (NOTE 4) |
| 8 | All except the conditions of access category 1 | RRC level MO signaling due tonon-paging consequences |
| 9-31 | | Reserved standardized Access Categories |
| 32-63 (NOTE 2) | All | Can be configured based on business classification |

NOTE 1:
A barring parameter for access category 1 may be accompanied by information defining whether it applies to a UE in one of the following categories:
a) UEs configured for delay tolerance service;
b) UEs that are configured for delay tolerance service and are not in HPLMN or PLMN equivalent to HPLMN;
c) UEs that are configured for delay tolerant service and are neither in the PLMN listed as "most preferred PLMN" of the country where the UE is roaming in the operator-defined PLMN selector list on the SIM/USIM, nor in their HPLMN nor in a PLMN that is equivalent to their HPLMN.
When a UE is configured for EAB, the UE is also configured for delay tolerant service. In case a UE is configured both for EAB and for EAB override, when upper layer (e.g. application layer) indicates to override Access Category 1, then Access Category 1 is not applicable.
If both an access category based on operator classification and an access category based on standardized access category, which are used for classifying the access attempt, exist, and the standardized access category is not 0 or 2, the UE applies the access category based on the operator classification. When both an access category based on operator classification and an access category based on a standardized access category, into which an access attempt can be classified, exist, and the standardized access category is 0 or 2, the UE applies the standardized access category.
NOTE 3:
Includes Real-Time Text (RTT).
NOTE 4:
Includes IMS Messaging.

The 5G network may broadcast barring control information in one or more areas of the RAN. The barring control information may be, for example, an access ID and a list of barring parameters related to an access category. The UE may determine whether a particular new access attempt is allowed based on the barring parameter (the UE receives from the broadcast barring control information) and the UE's settings.

In the case of a plurality of core networks sharing the same RAN, the RAN may apply access control to different core networks individually.

The unified access control framework may be applicable to both a UE accessing 5G CN (Core Network) using E-UTRA and a UE accessing 5G CN using NR.

The unified access control framework is applicable to the UE in the RRC (Radio Resource Control) Idle state, RRC Inactive (inactive) state and RRC Connected state when the UE initiates a new access attempt (e.g., a new session request).

For reference, "new session request" in the RRC Connected state may mean an event. For example, an event may be a new MMTEL voice session, a MMTEL video session, transmission of SMS (SMS over IP, or SMS over NAS), establishment of a new PDU session, modification of an existing PDU session, and a service request for re-establishing user plane for an existing PDU session.

5G systems may support means by which operators may define operator-defined access categories as mutually exclusive. For example, examples of criteria for operator-defined access categories may be network slicing, applications, and application servers.

The unified access control framework may be applicable to inbound roamers to the PLMN.

The serving PLMN may provide the definition of operator-defined access categories to the UE.

If the UE needs to access 5GS (5G System), the UE may first determine whether access is allowed by performing an access control check (access control check). Access control checks can be performed on access attempts defined by a list of events such as:

a) when the UE is in 5GMM (5GS Mobility Management)-IDLE mode through 3GPP access, and an event requiring a transition to 5GMM-CONNECTED mode occurs; and b) the UE is in 5GMM-CONNECTED mode via 3GPP access, or in 5GMM-CONNECTED mode with an RRC inactivity indication, and one of the following events occurs:

b-1) When NAS layer (e.g., 5GMM) of the terminal receives MO-MMTEL-voice-call-started information/indication, MO-MMTEL-video-call-started information/indication or MO-SMSoIP-attempt-started information/indication from an upper layer (e.g., application layer);

b-2) When NAS layer (e.g., 5GMM) of the terminal receives a request, for transmitting a mobile originated SMS over NAS, from a higher layer (e.g., application layer), and the request does not trigger a service request to switch the UE from 5GMM-IDLE mode to 5GMM-CONNECTED mode;

b-3) When the NAS layer (e.g., 5GMM) of the terminal receives a request for transmitting a UL NAS TRANASPORT message for the purpose of establishing a PDU session from an upper layer (e.g., an application layer), and the request does not trigger a service request to switch the UE from 5GMM-IDLE mode to 5GMM-CONNECTED mode;

b-4) When the NAS layer (e.g., 5GMM) of the terminal receives a request for transmitting a UL NAS TRANASPORT message for the purpose of PDU session modification from an upper layer (e.g., application layer), and the request does not trigger a service request to switch the UE from 5GMM-IDLE mode to 5GMM-CONNECTED mode;

b-5) when the NAS layer (e.g., 5GMM) of the terminal receives a request for re-establishing a user-plane resource for an existing (existing) PDU session; and When the NAS layer (e.g., 5GMM) of the terminal is notified that the uplink user data packet will be transmitted for the PDU session with the deferred user-plane resource.

When the NAS layer of the terminal detects one of the above-described events, the NAS layer of the terminal may perform an operation of mapping one or more access IDs and types of requests to access categories. In addition, a lower layer (e.g. an RRC layer) of the terminal may perform an access barring check for the request based on the determined access ID and access category. For reference, the NAS layer of the terminal may recognize the above-described events through information/indication provided from a higher layer and/or when determining that it is necessary to start a normal NAS operation.

In order to determine the access ID and access category of the request, the NAS layer of the terminal may check a set of access IDs and a reason for access related to the set of access categories (reason for access), the type of service requested and a profile of the UE including UE settings. Here, an example of the set of access IDs and the set of access categories is as follows:

A set of standardized access IDs;
A set of standardized access categories; and
A set of operator-defined access categories, if available.

When a terminal (e.g., UE) needs to initiate an access attempt for one of the events such as in the examples a) to b-6) above, the terminal may determine one or more access IDs related to the access attempt from a set of standardized access IDs, and the terminal mat determine one access category related to the access attempt among a set of standardized access categories and a set of operator-defined access categories.

For example, the set of accessible (applicable) access ID for a request related to an access attempt may be determined by the terminal (e.g., UE) in the following manner:

i) In the example of Table 3, for each of the access IDs 1, 2, 11, 12, 13, 14 and 15, the UE may check whether the access ID is available in the selected PLMN when a new PLMN is selected, or the UE may check whether the access ID is applicable to the RPLMN or equivalent PLMN; and ii) When there is no usable access ID among the access IDs 1, 2, 11, 12, 13, 14, and 15, the access ID 0 can be used.

In order to determine the available access category for the access attempt, the NAS layer of the terminal checks the rules as in the example in Table 5 below, and the NAS layer of the terminal may use the matching access category for a barring check (barring check).

Table 5 below is an example of a rule used when the NAS layer of the terminal determines the available access category for the access attempt.

TABLE 5

| Rule # (Rule Number) | Type of access attempt | Requirements to be met | Access category |
|---|---|---|---|
| 1 | response to notifications via paging or non-3GPP access; 5 GMM connection management procedure initiated for the purpose of delivering LTE Positioning Protocol (LPP) messages | Access attempt is for MT access | 0 (=MT_acc) |
| 2 | Emergency | UE attempts to access an emergency session (NOTE 1, NOTE 2) | 2 (=emergency) |
| 3 | Attempts to access operator-defined access categories | The UE currently stores valid operator-defined access category definitions within the current PLMN, and the access attempt matches the criteria of the operator-defined access category definition. | 32-63 (=based on operator classification) |
| 4 | Access attempt for delay tolerant service | (a) UE is configured for NAS signalling low priority or US supporting S1 mode is configured for EAB(Extended Access Barring) to which "EAB override" is not applied. (b) the UE received one of the categories a, b or c as part of the parameters for unified access control in the broadcast system information(e.g. broadcasted barring control information), and the UE is a member of the broadcasted category lin the selected PLMN or RPLMN/equivalent PLMN (NOTE 3, NOTE 5, NOTE 6) | 1 (=delay tolerant) |
| 5 | MO MMTel voice call | When the access attempt is for a MO MMTel voice call or when the access attempt is for NAS signaling connection recovery during an ongoing MO MMTel voice call (NOTE 2) | 4 (=MO MMTel voice) |
| 6 | MO MMTel video call | When the access attempt is for a MO MMTel video call Or when the access attempt is for NAS signaling connection recovery during an ongoing MO MMTel video call (NOTE 2) | 5 (=MO MMTel video) |
| 7 | MO SMS over NAS or MO SMSoIP | When the access attempt is for MO SMS over NAS or When the access attempt is for MO SMS over SMSoIP transfer or When the access attempt is for NAS signaling connection recovery during an ongoing MO SMS or SMSoIP transfer (NOTE 2) | 6 (=MO SMS and SMSoIP) |

TABLE 5-continued

| Rule # (Rule Number) | Type of access attempt | Requirements to be met | Access category |
|---|---|---|---|
| 8 | UE NAS initiated 5 GMM specific procedures | when the access attempt is for MO signaling | 3 (=MO_sig) |
| 9 | UE NAS initiated 5 GMM connection management procedure or 5 GMM NAS transport procedure | when the access attempt is for MO data | 7 (=MO_data) |
| 10 | when an uplink user data packet is to be sent for a PDU session with suspended user-plane resources | No further requirement is to be met | 7 (=MO_data) |

NOTE 1:
Herein, the 5 GMM specific procedures during service is ongoing and 5 GMM connection management procedures required to establish a PDU session with request types,which is "initial emergency request" or "existing emergency PDU session" or required to re-establish user-plane resources for these PDU sessions may be included. Also, this may include a service request procedure initiated by a service request message in which the service type IE is set to "emergency services fallback".

NOTE 2:
Access for the purpose for NAS signaling connection recovery during the service in progress, or access for the purpose for establishing the NAS signaling connection afterthe fallback indication received from the lower layer during the service in progress may be mapped to the access category of the ongoing service, in order to derive the RRC establishment cause. However, a barring check may be skipped for this access attempt.

NOTE 3:
When the UE selects a new PLMN, the selected PLMN may be used to check membership; Otherwise, the UE may use RPLMN or PLMN equivalent to the RPLMN.

NOTE 4:
This may include a 5GMM connection management procedure triggered by a UE-initiated NAS transport procedure for transmitting the MO SMS.

NOTE 5:
If the available access category for the access attempt is 1, the UE may further determine a second access category in the range of 3 to 7. If more than one access category is matched, the access category with the lowest rule number will be selected. The UE may use the second access category only to detect the RRC establishment reason for the access attempt.

NOTE 6:
If the UE is not configured to allow overriding of the EAB, or the NAS layer of the UE does not receive an indication to override the EAB from a higher layer (eg, an application layer), and if the UE dos not have a PDU session established based on EAB, "EAB override" may not be applied.

When the access attempt matches one or more rules, an access category having the lowest rule number among the one or more rules may be selected. If the access attempt matches one or more operator-defined access category definitions, the UE may select the operator-defined access category definition with the lowest precedence value. Here, a case in which one access attempt matches one or more rules may include a case in which a plurality of events simultaneously trigger one access attempt. When the UE is in 5GMM-IDLE mode, when the NAS layer of the terminal receives a request for an access attempt from an upper layer of the terminal, the NAS layer of the terminal may classify the access attempt into an access ID and access categories according to the examples of Tables 4 and 5 described above. For access control checking, the NAS layer of the terminal may transmit a request including an available access ID and an available access category to a lower layer (e.g., an RRC layer). Lower layers may perform access barring checks. The NAS layer of the terminal may provide the RRC establishment cause in the request to the lower layer. According to an implementation option, the NAS layer of the terminal may provide the RRC establishment cause to the lower layer after receiving a notification that the access attempt is allowed from the lower layer.

When the lower layer informs the NAS layer that the access attempt is allowed, the NAS layer may initiate a procedure for sending an initial NAS message for the access attempt.

When the lower layer informs the NAS layer that the access attempt is barred, the NAS layer may not initiate a procedure for sending an initial NAS message for the access attempt. In addition, if the event that triggered the access attempt was MO-MMTEL-voice-call-started information/indication, MO-MMTEL-video-call-started information/indication, or MO-SMSoIP-attempt-started information/indication, the NAS layer may notify an upper layer (e.g., an application layer) that the access attempt is barred. In this case, when the NAS layer receives information/indication from the lower layer (e.g., the RRC layer) that the barring for the access category related to the access attempt has been relaxed, the NAS layer may inform to the upper layer that the barring for the access category has been relaxed. And, the NAS layer may initiate a procedure for transmitting the initial NAS message, if still necessary. For reference, a barring timer for each access category may be run by a lower layer. When the barring timer expires, the lower layer may notify the NAS layer of information/indication that the access barring has been relieved for each access category.

When the UE is in 5GMM-CONNECTED mode or 5GMM-CONNECTED mode with RRC deactivation indication, and when the upper layer of the terminal detects one of the events of b-1) to b-6) described above, the NAS layer of the terminal may receive a request for an access attempt from an upper layer of the terminal. Then, the NAS layer of the terminal may classify the access attempt into an access ID and an access category according to the examples of Tables 4 and 5 described above. For access control checking, the NAS layer of the terminal may transfer a request including an available access ID and an available access category to a lower layer (eg, an RRC layer). Lower layers may perform access barring checks. The NAS layer of the terminal may provide the RRC establishment cause in the request to the lower layer. According to an implementation option, the NAS layer of the terminal may provide the RRC establishment cause to the lower layer after receiving a notification that the access attempt is allowed from the lower layer.

When the UE builds a registration request (REGISTRATION REQUEST) message or a service request (SERVICE REQUEST) message for an access attempt, when the UE has uplink user data pending for one or more PDU sessions, the UE may indicate each PDU session in an uplink data state information element (IE), regardless of the access category for which the access barring check is performed. Even if the barring timer is running for some of the corresponding access categories, the UE may indicate user data waiting for each PDU session.

When the downlink layer informs the NAS layer that the access attempt is allowed, the NAS layer may perform the following actions according to the event triggering the access attempt:

a) When the event triggering the access attempt is MO-MMTEL-voice-call-started information/indication, MO-MMTEL-video-call-started information/indication, or MO-SMSoIP-attempt-started information/indication, the NAS layer may notify an upper layer (e.g., an application layer) that the access attempt is allowed;

b) When the event triggering the access attempt is a request from an upper layer to transmit a mobile originated SMS over NAS, the NAS layer (e.g., 5GMM layer) may initiate a NAS transport procedure for transmitting the SMS in a UL NAS TRANSPORT message;

c) When the event triggering the access attempt is a request from an upper layer to establish a new PDU session, the NAS layer (e.g., 5GMM layer) may initiate a NAS transport procedure to transmit a PDU session establishment request message;

d) When the event triggering the access attempt is a request from an upper layer to modify an existing PDU session, the NAS layer (e.g., 5GMM layer) may initiate a NAS transport procedure to transmit a PDU session modification request message;

e) When the event triggering the access attempt is a request for re-establishing a user-plane resource for an existing PDU session, the NAS layer (e.g., 5GMM layer) may initiate a service request procedure; and f) If the event triggering the access attempt is an uplink user data packet to be transmitted for a PDU session with a delayed user-plane resource, the NAS layer (eg 5GMM layer) may consider that the uplink user data packet can be transmitted.

When the downlink layer informs the NAS layer that the access attempt is barred, the NAS layer may perform the following actions according to the event triggering the access attempt:

a) When the event triggering the access attempt is MO-MMTEL-voice-call-started information/indication, MO-MMTEL-video-call-started information/indication, or MO-SMSoIP-attempt-started information/indication, the NAS layer may notify the upper layer that the access attempt is barred. The upper layer may prohibit the initiation of the MMTEL voice session, the transmission of the MMTEL video session or SMS over IP. In this case, when the NAS layer receives information/indication from the lower layer (eg, the RRC layer) that the barring for the access category related to the access attempt has been relaxed, the NAS layer may inform the higher layer that the barring for the access category has been relaxed;

b) When the event triggering the access attempt is a request from an upper layer to transmit a mobile originated SMS over NAS, the NAS layer (e.g., 5GMM layer) may not initiate NAS transfer procedure to transmit the SMS through a UL NAS TRANSPORT message. When the NAS layer receives the information/indication from the lower layer (e.g., the RRC layer) that the barring for the access category associated with the access attempt has been relaxed, the NAS layer may initiate the NAS transfer procedure if the NAS transfer procedure is still required;

c) If the event triggering the access attempt is a request from a higher layer to establish a new PDU session, the NAS layer (e.g., 5GMM layer) may not initiate a NAS transport procedure to transmit a PDU session establishment request message. When the NAS layer receives the information/indication from the lower layer (e.g., the RRC layer) that the barring for the access category associated with the access attempt has been relaxed, the NAS layer may initiate the NAS transfer procedure if the NAS transfer procedure is still required;

d) When the event triggering the access attempt is a request, which is for modifying an existing PDU session, from an upper layer, the NAS layer (e.g., 5GMM layer) may not initiate a NAS transport procedure to transmit a PDU session modification request message. When the NAS layer receives the information/indication from the lower layer (e.g., the RRC layer) that the barring for the access category associated with the access attempt has been relaxed, the NAS layer may initiate the NAS transfer procedure if the NAS transfer procedure is still required;

e) When the event triggering the access attempt is a request for re-establishing a user-plane resource for an existing PDU session, the NAS layer (e.g., 5GMM layer) may not initiate a service request procedure. When the NAS layer receives the information/indication from the lower layer (e.g., the RRC layer) that the barring for the access category associated with the access attempt has been relaxed, the NAS layer may initiate the service request procedure if the service request procedure is still required; and f) If the event triggering the access attempt is an uplink user data packet to be transmitted for a PDU session with a delayed user-plane resource, the NAS layer (e.g. 5GMM layer) may not consider that the uplink user data packet may be transmitted. When the NAS layer receives information/indication from a lower layer (e.g., the RRC layer) that the barring for the access category related to the access attempt has been relaxed, the NAS layer may consider that the barring for the access category has been relaxed.

For reference, when the terminal is connected to an IM (IP Multimedia) CN (Core Network) subsystem, a specific example to which the unified access control is applied is as follows. Here, the IM CN subsystem may mean a core network of the IMS.

An upper layer (e.g., an application layer) of the terminal may provide information such as the following example to the NAS layer of the terminal:

MO-MMTEL-voice-started;
MO-MMTEL-voice-ended.
MO-MMTEL-video-started; and
MO-MMTEL-video-ended;

When the upper layer (e.g., application layer) of the terminal receives a request to establish an originating multimedia telephony (MMTEL) communication session from the user, the upper layer (e.g., application layer) of the terminal of the terminal may performs operations as in the following example:
1) If the MMTEL communication session to be established is an emergency session, the following steps may be skipped and the procedure for establishing the MMTEL communication set may be performed;
2) If audio or real-time text or both audio and real-time text are provided in the MMTEL communication session, and there is no other outgoing MMTEL communication session providing audio, or real-time text or audio and real-time text, the application layer of a terminal (e.g., UE) may transmit the MO-MMTEL-voice-started indication/information to the NAS layer, and:
2-a) If the barring result is "not-barred", the upper layer (e.g., application layer) of the terminal may continue the session establishment procedure for establishing the MMTEL communication session. For reference, the barring result may be a barring result for the MO-MMTEL-voice-started indication/information delivered from the NAS layer.
2-b) when the barring result is "barred", the upper layer (e.g., the application layer) of the terminal rejects the MMTEL communication session establishment, and may skip the following steps; and
3) When video is provided in the MMTEL communication session and there is no other outgoing MMTEL communication session providing video, the application layer of the UE may transmit the MO-MMTEL-video-started indication/information to the NAS layer, and:
3-a) If the barring result is "not-barred", the upper layer (e.g., the application layer) of the terminal may continue the session establishment procedure for establishing the MMTEL communication session.
3-b) If the barring result is "barred", the upper layer (e.g., the application layer) of the terminal rejects the establishment of the MMTEL communication session, and may skip the following steps.

For reference, while communication based on the MMTEL communication session is being performed, adding or removing media may not be subject to unified access control.

When an outgoing MMTEL communication session (an outgoing MMTEL communication session that was initiated providing audio or real-time text or both audio and real-time text) is terminated (e.g., due to a response to a BYE message or a failed response to an initial INVITE request message), and if there is no other outgoing MMTEL communication session providing audio or real-time text or audio and real-time text, the application layer of the terminal (e.g., UE) transmits the MO-MMTEL-voice-ended indication/information to the NAS layer. can When the outgoing MMTEL communication session (the outgoing MMTEL communication session that was initiated providing video) is terminated (e.g., the response to the BYE message is due to a failure response to the initial INVITE request message), and if another outgoing MMTEL communication session providing video (e.g. in the SDP (Session Description Protocol) offer included in INVITE request message) does not exist, the application layer of the terminal (e.g., UE) may transmit the MO-MMTEL-video-ended indication/information to the NAS layer.

Under the above IMS, an IP-based session may be controlled by a session initiation protocol (SIP). SIP is a protocol for controlling a session. SIP is a protocol for controlling session, SIP is signaling protocol specifying a procedure for terminals wanting to communicate to identify each other and find their location, create a multimedia service session between them, or delete and change the created session. This SIP uses a SIP Uniform Resource Identifier (URI) similar to an e-mail address to identify each user, so that a service can be provided without being dependent on an IP (Internet Protocol) address. These SIP messages are control messages, but are transmitted between the UE and the IMS network through the user plane of the 5G core network.

<IoT (Internet of Things) Communication>

Meanwhile, the IoT will be described below.

The IoT refers to information exchange between IoT devices through a base station or information exchange between an IoT device and a server through a base station, without human interaction. In this way, since IoT communication passes through a cellular base station, it is also called CIOT (Cellular Internet of Things).

Such IoT communication is a type of MTC (Machine Type Communication). Accordingly, the IoT device may be referred to as an MTC device.

Since IoT communication has a small amount of transmitted data and infrequent transmission and reception of uplink or downlink data, it is desirable to lower the unit price of the IoT device and reduce battery consumption according to a low data rate. In addition, since the IoT device has low mobility, the channel environment hardly changes.

As one method for reducing the cost of the IoT device, the IoT device may use a subband of, for example, about 1.4 MHz, regardless of the system bandwidth of the cell.

The IoT communication operating on the reduced bandwidth may be referred to as NB (Narrow Band) IoT communication or NB CIOT communication.

II. Disclosure of the Present Specification

The disclosures described below in this specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below.

With the spread of LTE, the spread of general-purpose high-performance computing devices such as smartphones has been promoted. In addition, various services using such general-purpose high-performance computing devices have appeared. On the other hand, based on LTE, the need to provide communication using a mobile communication system to IoT (Internet on Things) terminals using a specific low-power application has emerged. Accordingly, 3GPP established a new standard called Narrowband (NB)-IoT to support low-power IoT terminals based on the LTE standard. The NB-IoT wireless standard uses a narrowband frequency of around 200 kHz and is a standard for providing communication services to IoT terminals based on signaling between the eNB and the MME.

In Rel-15 (Release 15), the first standard of the 5G system, architecture and wireless standards for supporting broadband communication services of communication devices such as smartphones were discussed. Afterwards, in the Rel-16 standard of the 5G system, a method of supporting the NB-IoT wireless standard in the 5G system was introduced, making it possible to combine the 5G core network and the NB-IoT wireless standard.

An IoT terminal can only perform a function for a specific purpose. In addition, IoT terminals can be used in various industries. Due to these characteristics of IoT terminals, the number of IoT terminals may be several tens or hundreds of times greater than the number of smartphones carried by humans. Accordingly, when these IoT terminals simultaneously access the network or when the IoT terminals attempt to transmit data at the same time, congestion of radio resources or overload of network nodes may occur. Therefore, in order to prevent such congestion or overload, when utilizing the IoT terminal, the network may use access control as one of the important functions.

In the 5G system, the terminal and/or the network may perform access control using integrated access control.

The IoT terminal can generate low-priority data in most cases. For example, in the case of an IoT terminal performing a temperature sensing operation, data on the temperature sensed by the IoT terminal may not be frequently transmitted in very short units such as 1 ms intervals. These IoT terminals can generate and transmit data at intervals of about one hour. And, data generated by such an IoT terminal may be insensitive to a transmission delay. For example, even if the temperature data generated by the IoT terminal is transmitted after 30 seconds or 1 minute, there may be no problem.

There is no big problem even if data with low priority of these IoT terminals is delayed, but on the contrary, if data of a smartphone used by a person is delayed, a problem (e.g., adversely affecting the user experience) may occur. For example, in the case of a human smartphone, if an incoming call rings 10 seconds late due to delay, the user experience may be adversely affected.

As described above, when a certain cell performs access control on the IoT terminal, based on the characteristics of the IoT service (e.g., temperature sensing operation), the network and/or the IoT terminal may process a priority of data of the IoT terminal as a low priority. This is because, as described above by taking an example of the temperature sensing operation, most data generated by the IoT terminal is insensitive to transmission delay or has a long data generation period.

However, in some cases, delivery of service data generated by the IoT terminal may be urgent. For example, in the case of an IoT terminal for fire detection (e.g., an IoT terminal that is fixed at a specific location and performs a fire detection operation), the data generated by the IoT terminal for fire detection most of the time may be "no fire". Therefore, the transfer of such data (e.g. "no fire" data) may not be urgent. However, when an actual fire occurs, the data of the IoT terminal for fire detection must be delivered very quickly.

As in this example, among data generated by the IoT terminal, data requiring an emergency may be defined as exception data. And, for this exception data, as shown in the example of Table 6 below, access category No. 10 may be allocated.

Table 6 below shows examples of access categories that can be defined by a combination of conditions related to the UE and types of access attempts.

TABLE 6

| Access Category number | Conditions related to UE | Type of access attempt |
|---|---|---|
| 0 | All | MO signalling resulting from paging |
| 1 (NOTE 1) | The UE is configured for delay t toleran service, and may be a target of access control for access category 1 (a target of access control determined according to the relationship between the HPLMN of the UE and the selected PLMN). | All except for Emergency |
| 2 | All | Emergency |
| 3 | All except for the conditions in Access Category 1. | MO signalling on NAS level resulting from other than paging |
| 4 | All except for the conditions in Access Category 1. | MMTEL (multimedia telephony) voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9 | All except for the conditions in Access Category 1 | MO IMS registration related signalling (NOTE 5) |

TABLE 6-continued

| Access Category number | Conditions related to UE | Type of access attempt |
|---|---|---|
| 10 (NOTE 6) | All | MO exception data |
| 11-31 | | Reserved standardized Access Categories |
| 32-63 (NOTE 2) | All | Can be configured based on operator classification |

(NOTE 1):
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
When a UE is configured for EAB, the UE is also configured for delay tolerant service. In case a UE is configured both for EAB and for EAB override, when upper layer indicates to override Access Category 1, then Access Category 1 is not applicable.
(NOTE 2):
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
(NOTE 3):
Includes Real-Time Text (RTT).
(NOTE 4):
Includes IMS Messaging.
(NOTE 5):
Includes IMS registration related signalling, e.g. IMS initial registration, re-registration, and subscription refresh.
(NOTE 6):
Applies to an NB-IoT UE, using NB-IOT connectivity to 5GC.

Referring to the example of Table 6, when the NB-IoT UE is connected to 5GC, access category No. 10 may be allocated to the exception data of the NB-IoT UE. In the current NR radio standard, all terminals must support data communication at a frequency of a bandwidth corresponding to at least 100 MHz. Accordingly, compared to the existing LTE terminal, the power consumption of the terminal supporting 5G communication has increased rapidly. However, the time during which the terminal operates using the 100 MHz broadband frequency may be very short, and it may be inefficient for the terminal to transmit and receive data using the 100 MHz broadband frequency most of the time. Accordingly, it may be more efficient for a terminal using a general broadband wireless access technology to additionally support an IoT-optimized wireless access technology. For example, it may be more efficient for such a terminal to communicate by switching between these two wireless access technologies (e.g., broadband wireless access technology and IoT-optimized wireless access technology) depending on the service situation, rather than operating using only 100 MHz broadband frequency.

In addition, smartphones have become people's daily necessities. If a user loses a smartphone, if the smartphone continues to use broadband wireless access technology, a situation may occur that consumes power within a short time. In this situation, since the power of the smart phone is turned off, the user cannot retrieve his/her smart phone. In this case, if the smart phone uses a power saving wireless access technology optimized for IoT, the power can be maintained for a longer period of time, increasing the probability that the user will retrieve the smart phone.

Therefore, the 5G system efficiently controls terminals supporting both broadband wireless access technology (e.g., NR broadband wireless access technology, WB (Wideband)-LTE, etc.) and IoT wireless access technology (NB-IoT), and it is necessary to perform access control according to the operation of the terminal.

On the other hand, not all IoT terminals use exception data. As described above for example, only a terminal supporting a service that needs urgent communication in an actual special situation (e.g., fire) may need to use exception data. And, the rules for using exception data should be strict. This is because, when the IoT terminal arbitrarily transmits data using the exception data in a situation where urgent communication is not required, there is a risk that the transmission of more important MO data of another terminal is delayed.

For example, it is assumed that the IoT sensor terminal performs daily temperature measurement. When the IoT sensor terminal measures the temperature at a specific time, measurement data may be generated. In order to reduce the time required to transmit the measurement data generated by temperature measurement to the network, the IoT sensor terminal may arbitrarily process the measurement data as exception data and transmit the data. Then, since the data that the IoT sensor terminal arbitrarily processed as exception data is preferentially transmitted to the network, there is a risk of delay in the transmission of more important MO data (e.g., fire occurrence data) of other terminals to the network.

Therefore, in the disclosure of the present specification, even in a situation in which various terminals (e.g., non-IoT terminals and complex IoT terminals (e.g., terminals supporting both IoT services and non-IoT services)) are mixed in a mobile communication system, the present disclosure proposes a method by the network and/or the terminal to efficiently control radio resource allocation and congestion. For example, the disclosure of the present specification may propose a method for controlling radio resource allocation and congestion by the network and/or the terminal efficiently consider the characteristics of each terminal and the characteristics of data generated by each terminal.

In the disclosure of this specification, the terminal and the network may perform the following operations.

In the process of requesting registration to the network, the terminal may transmit a request for a service or communication that the terminal intends to use. For example, the terminal may transmit a request message including information related to the use of exception data to the network.

In the process of processing the registration request of the terminal, the network may transmit information on the characteristics of data that the terminal can use based on the request for service or communication transmitted by the terminal. For example, the network may transmit a response message including information on whether the use of the exception data is allowed to the terminal.

For example, the information on the characteristics of the data may be information on whether the terminal can transmit high-priority data such as exception data. The terminal may check whether transmission of the exception data is permitted to the terminal based on the information on the characteristics of the data. For example, when the terminal needs to access the network from the IoT cell, and when the terminal tries to transmit data to the network based on the connection, when the data is important data, the terminal may check first whether the transmission of exception data is allowed for the terminal itself. For example, the terminal may be implemented as an application layer and a communication layer (e.g., the NAS layer and the AS layer in FIG. 4), when the application layer requests transmission of a certain data packet to the communication layer each time, the application layer may inform the type of the data packet with the such request. For example, the application layer of the terminal may inform the communication layer whether the data is general data or exception data. An application (e.g., an application running in the application layer) may have a logic that determines what kind of data it generates each time through internal logic. For example, assuming an earthquake measurement application, when the earthquake measurement application communicates with a seismic measurement related server, it usually generates data indicating that it is operating normally, or when an earthquake is detected, it may generate data for notifying quickly. Accordingly, within the application, it is possible to determine whether the data is exception data or not according to the type of the generated data, and the application layer may deliver this information to the communication layer. Based on this, the communication layer of the terminal that has received this information (e.g., information on whether the data generated by the application layer is exception data) can utilize this information in the process of establishing a connection with the network. If the transmission of the exception data is allowed, the terminal may check whether its own access is allowed by using the access category (ie, AC 10) corresponding to the exception data. If access is allowed, the terminal may attempt RRC connection or NAS connection.

As described with the example above, when the data generated by the terminal corresponds to the exception data, the terminal is located in the NB-IoT cell, and the use of the exception data is allowed for the terminal, the access category corresponding to the exception data (that is, AC 10) can be used. If the data generated by the terminal does not correspond to the exception data (e.g., when the data generated by the terminal is not important data), or the data generated by the terminal corresponds to the exception data, but the use of exception data (or use of AC 10) for the terminal is not allowed by the network, or if the terminal is not located in the NB-IoT cell, the terminal may check whether its own access is allowed or not by using another access category other than using AC 10 corresponding to exception data. For example, when the terminal is not located in the NB-IoT cell or when the use of exception data is not allowed to the terminal, the terminal is placed in an environment where AC 10 cannot be used, so the terminal selects an access category to be used by the terminal among access categories other than AC 10. For example, in the above example, since the data packet generated by the application is transmitted, if the terminal is not configured for low priority for IoT, etc., the terminal may select accesses category 7, that is, access category for user plane data transmission. Alternatively, if the terminal is set to low priority for IoT, etc., the terminal may use access category 2.

In the above-described operation, the network (e.g., a network node such as AMF) may perform an operation to allow transmission of exception data to the terminal. For example, upon receiving a registration request message from the terminal, the network may check the subscription information of the terminal and check the policy of the network based on the subscription information of the terminal. The network may determine whether to allow the use of the terminal's exception data based on the subscription information of the terminal and/or the policy of the network. When the network permits the use of the exception data of the terminal, the network may transmit information indicating that the use of the exception data is allowed to the terminal. The terminal may receive information indicating that the use of exception data is allowed from the network. In this case, the terminal may determine that the terminal can use the exception data based on the information that the use of the exception data is allowed. If, in fact, such data (e.g., data corresponding to the exception data) occurs, the terminal may use the access category (e.g., AC 10) corresponding to the exception data.

The condition that the terminal uses the access category (e.g., AC 10) corresponding to the exception data may be set as shown in the example of Table 7 below.

TABLE 7

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |

TABLE 7-continued

| Access Category number | Conditions related to UE | Type of access attempt |
| --- | --- | --- |
| 2 | All | Emergency |
| 3 | All except for the conditions in Access Category 1. | MO signalling on NAS level resulting from other than paging |
| 4 | All except for the conditions in Access Category 1. | MMTEL (multimedia telephony) voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signalling on RRC level resulting from other than paging |
| 9 | All except for the conditions in Access Category 1 | MO IMS registration related signalling (NOTE 5) |
| 10 (NOTE 6) | All | MO exception data |
| 11-31 | | Reserved standardized Access Categories |
| 32-63 (NOTE 2) | All | May be configured based on operator classification |

(NOTE 1):
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
When a UE is configured for EAB, the UE is also configured for delay tolerant service. In case a UE is configured both for EAB and for EAB override, when upper layer indicates to override Access Category 1, then Access Category 1 is not applicable.
(NOTE 2):
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
(NOTE 3):
Includes Real-Time Text (RTT).
(NOTE 4):
Includes IMS Messaging.
(NOTE 5):
Includes IMS registration related signalling, e.g. IMS initial registration, re-registration, and subscription refresh.
(NOTE 6):
Applies to an UE when the UE is located in the NB-IoT cell. This applies when use of 'exception data' is allowed for the UE.

According to NOTE 6 in the example of Table 7, using AC 10 for exception data may be applied to the UE when the UE is located in the NB-IoT cell. The use of AC 10 for exception data may be applied when the use of 'exception data' is allowed for the UE. For example, using AC 10 for exception data may be applied to access to an NB-IoT cell (NB-IoT cell connected to 5GC) of an NB-IoT capable UE, if the UE is allowed to transmit the exception data. Hereinafter, a flowchart for explaining the operation of the terminal and/or the operation of the network according to the disclosure of the present specification will be described with reference to the examples of FIGS. 7 to 9.

The following drawings were created to explain a specific example of the present specification. The names of specific devices described in the drawings or the names of specific signals/messages/fields are presented by way of example, so that the technical features of the present specification are not limited to the specific names used in the following drawings.

FIG. 7 shows an example of operation of a network and/or a terminal according to the disclosure of the present specification.

Referring to FIG. 7, UE, gNB (NB-IoT), gNB (NR), AMF, UDM/PCF (UDM and/or PCF) are shown. The gNB (NB-IoT) may be a gNB that supports NB-IoT communication. The gNB (NR) may be a gNB that supports general NR communication rather than NB-IoT.

0) The terminal is powered on, and a NAS entity (e.g., NAS layer) of the terminal may request registration of the terminal. For example, the terminal may transmit a registration request message to the AMF. In this case, the terminal may transmit information requesting permission to transmit the exception data by including it in the registration request message. For example, when the terminal needs to perform an IoT function (e.g., IoT-related communication) and transmission of exception data is required, the terminal may include information requesting permission to transmit exception data in the registration request message. For example, the IoT terminal manufacturer or user may determine whether or not exception data is generated according to the setting or operation of the application of the corresponding terminal, and the IoT terminal manufacturer or user enables the terminal to operate accordingly. For example, a fire department may install several IoT terminals in each apartment complex, some IoT terminals may be set to measure only temperature, and some IoT terminals may be set to detect only specific harmful gases. In this case, the terminal for measuring only the temperature may be set not to use the transmission of the exception data, and the terminal for detecting the harmful gas may be set to use the transmission of the exception data. According to this configuration information, each terminal can know whether or not to request permission to transmit the exception data.

1) When the AMF receives a request from the terminal (e.g., a registration request message), the AMF may acquire information about the terminal's service subscription and/or policy to be applied to the terminal from UDM and/or PCF, etc. For example, when the AMF receives a registration request message, the AMF may send a message requesting subscription data (e.g., subscription data) and/or policy (e.g., Get subscription data/policy message) to the UDM and/or PCF. have. Then, the UDM and/or PCF may transmit information on service subscription and/or policy to be applied to the terminal to the AMF.

2) Based on the information received in step 1), the network may determine whether to permit transmission of the exception data to the terminal. For example, the AMF may determine whether or not to allow a terminal (e.g., a terminal that has transmitted information requesting permission to transmit exception data) to transmit exception data, based on based on information on service subscription and/or policy to be applied to the terminal. For example, if the service subscription information includes information that the transmission of exception data is permitted to the terminal, and policy information to be applied to the terminal includes information that the transmission of exception data is permitted to the terminal, the AMF may determine that the terminal is allowed to transmit the exception data.

3) According to the result of step 2) (e.g., the result of determining whether to allow the transmission of the exception data to the terminal), when the transmission of the exception data is permitted to the terminal, the network may transmit a registration response message or a registration acceptance message including information that the transmission of the exception data is permitted to the terminal. For example, the AMF may transmit a registration response message (or registration acceptance message) including information indicating that transmission of the exception data is permitted to the terminal.

For reference, in the example of FIG. 7, an example in which the terminal receives information indicating that transmission of exception data is permitted has been described with reference to steps 0) to 3). However, this is only an example, and the terminal may acquire information indicating that the transmission of the exception data is permitted in a method other than the method described in steps 0) to 3). For example, the terminal may receive information indicating that transmission of exception data is permitted through a UE configuration update procedure. For another example, the terminal may obtain information that the transmission of the exception data is permitted through information stored in the SIM of the terminal. In addition, the terminal may receive information that the transmission of the exception data is permitted from a network node other than the AMF.

4) The UE may stay in the NR cell (gNB (NR)). For example, the terminal can camp on the NR cell.

5) Exception data may be transmitted from the upper end of the terminal. For example, an access attempt related to the exception data may be generated in the application layer of the terminal, and the application layer of the terminal may transmit the access attempt related to the exception data to the NAS layer of the terminal. For example, when a data packet is generated by an application, the application layer may deliver the data packet and information on whether the data packet is exception data or not to the NAS layer. Then, the NAS layer and the RRC layer may transmit data when access is allowed after performing an access control check. As another example, when a data packet is generated by an application, an application layer may deliver information indicating that data has been generated and information on whether or not the data is exception data to the NAS layer. The NAS layer and the RRC layer may perform an access control check. If access is allowed after performing an access control check, the NAS layer may inform the application that access is allowed. Then, since the application layer delivers the actual data packet to the NAS layer and an access control check has already been performed, the NAS layer and the RRC layer may directly transmit data without an additional access control check.

6) Since the terminal is currently staying in the NR cell, the terminal does not use AC 10 even if the terminal supports the NB-IoT connectivity function. Accordingly, the terminal may perform an access control check using AC 7 corresponding to Mo Data. Specifically, the NAS layer of the terminal may perform a procedure of selecting an access category of exception data. For example, the terminal may determine the access category of the exception data based on whether it supports NB-IoT communication, whether the transmission of the exception data is permitted, and whether it is connected to the NB-IoT cell. As an example, the terminal may use AC 10 when the terminal supports NB-IoT communication, transmission of exception data is allowed, and the terminal is connected to the NB-IoT cell. As another example, the terminal may use another access category (e.g., AC 7 in the example of Table 7), when the terminal supports NB-IoT communication, and when the transmission of exception data is allowed or when the terminal is not connected to the NB-IoT cell. The NAS layer of the terminal may determine the access category, and the RRC layer of the terminal may perform an access control check on the determined access category.

7) If access is allowed according to the result of step 6) (e.g., the result of access control check), the terminal may transmit data. For example, when access is permitted according to the result of the access control check performed in step 6), the UE may transmit data to the NR cell (gNB (NR)).

8) The terminal may camp on the NB-IoT cell (e.g. gNB (NB-IoT)).

9) Exception data may be transmitted from the upper end of the terminal. For example, exception data may be generated in the application layer of the terminal, and the application layer of the terminal may deliver the exception data to the NAS layer of the terminal.

10) Since the UE is currently staying in the NB-IoT cell, the UE may consider that it may use AC 10 in the corresponding cell. Additionally, the UE may check whether the use of AC 10 (i.e., use of exception data) is allowed. Since use of the terminal's exception data is permitted in step 3) (e.g., the terminal has received information indicating that the transmission of the exception data is allowed), the terminal may select AC 10. The UE may perform an access control check based on AC 10. If the use of the terminal's exception data is not allowed in step 3) (i.e., the terminal does not receive information indicating that the transmission of the exception data is allowed, or the terminal receives information indicating that the transmission of the exception data is not allowed), the UE may perform an access control check using another access category (e.g., AC 7) without using AC 10.

11) If access is permitted according to the result of step 10) (e.g., the result of access control check), the terminal may transmit data. For example, according to the result of the access control check performed in step 10), when the connection is permitted, the terminal may transmit data to the NB-IoT cell (gNB (NB-IoT)). Specifically, the terminal may transmit data to the network node via an NB-IoT cell (gNB (NB-IoT)). For example, the terminal may transmit NAS data including data to the AMF through an NB-IoT cell (gNB (NB-IoT)).

Hereinafter, an example of the operation of the terminal (e.g., UE) and the operation of the AMF described above will be described with reference to FIGS. 8 and 9. For reference, in the description with reference to FIGS. 8 and 9, the operation of the terminal and the operation of the AMF are only examples, and the scope of the disclosure of the present specification includes all the operation of the terminal and the AMF of the description with reference to FIGS. 8 and 9 and described above. That is, the terminal may perform both the operation described in the example of FIG. 8 and the operation of the terminal in the example of FIG. 7 described above. In addition, the AMF may perform both the operation described in the example of FIG. 9 and the operation of the AMF in the example of FIG. 7 described above.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 8:
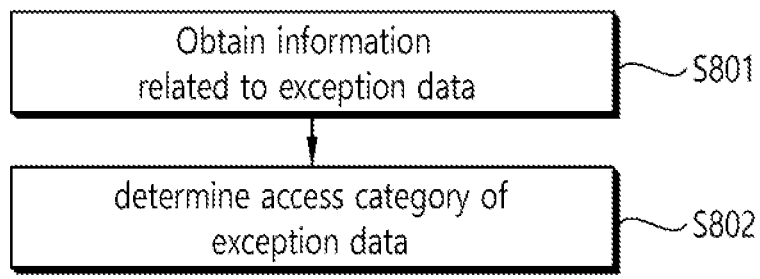
FIG. 8 shows an example of the operation of the terminal according to the disclosure of the present specification.

FIG. 8 shows an example of the operation of the terminal according to the disclosure of the present specification.

In step S801, the terminal (e.g., UE) may obtain information related to exception data. For example, the terminal may receive a message including information indicating that the use of exception data is allowed from a network node (e.g., AMF). For another example, the terminal may obtain information that the transmission of the exception data is allowed through information stored in the SIM of the terminal. In addition, the terminal may receive information that the transmission of the exception data is permitted from a network node other than the AMF.

In step S802, the terminal may determine the access category of the exception data. Specifically, the terminal may determine an access category of an access attempt related to the exception data based on the information related to the exception data. As an example, exception data may be transmitted from an upper end (e.g., an application layer) of the terminal. The terminal (e.g., the NAS layer of the terminal) may determine the access category of the access attempt related to the exception data. For example, the terminal may determine the access category as the access category 10 based on the information that the use of the exception data obtained in step S801 is permitted.

For example, based on whether it supports NB-IoT communication, whether transmission of the exception data is permitted, and whether it is connected to the NB-IoT cell, it is possible to determine the access category of the exception data. As an example, the terminal may use AC 10 when the terminal supports NB-IoT communication, the terminal is permitted to transmit exception data, and when the terminal is connected to the NB-IoT cell. As another example, when the terminal supports NB-IoT communication, transmission of exception data is allowed, and when the terminal is not connected to the NB-IoT cell, the terminal may use another access category (e.g., AC 8 in the example of Table 7). The NAS layer of the terminal may determine the access category, and the RRC layer of the terminal may perform an access control check for the determined access category. According to the result of the access control check, if access is allowed, the terminal may transmit data.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 9:
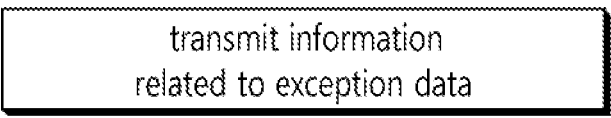
FIG. 9 shows an example of the operation of the AMF according to the disclosure of the present specification.

FIG. 9 shows an example of the operation of the AMF according to the disclosure of the present specification.

In step S901, the AMF may transmit information related to the exception data to the terminal. For example, the AMF may transmit information that the use of exception data is permitted for the terminal to the terminal. The AMF may transmit a message (e.g., a registration response message) including information that the use of exception data is allowed to the terminal.

Before step S901 is performed, the terminal may transmit a message (e.g., a registration request message) including information requesting to allow the use of the exception data to the AMF. Then, the AMF may transmit information that the use of the exception data is allowed for the terminal to the terminal based on that the terminal transmitted information requesting the use of the exception data.

AMF may determine whether to allow transmission of exception data to the terminal. For example, when the AMF receives a request of the terminal (e.g., a registration request message), the AMF may obtain information about service subscription of the terminal and/or policy to be applied to the terminal from UDM and/or PCF, etc. The AMF may determine whether to allow the terminal (e.g., a terminal that has transmitted information requesting permission to transmit exception data) to transmits exception data, based on information about service subscription and/or policy to be applied to the terminal. For example, if the service subscription information includes information that the transmission of exception data is allowed for the terminal, and policy information to be applied to the terminal includes information that the transmission of exception data is allowed for the terminal, the AMF may determine to allow the terminal to transmit the exception data.

As described in the disclosure of the present specification, even for a terminal supporting NB-IoT wireless access and other broadband wireless access, access control can be effectively supported. In addition, as the network transmits information on whether the terminal is allowed to use the exception data to the terminal, high priority access of the terminal for which the use of the exception data is not permitted can be prevented, and radio resources can be effectively used in the cell. Through this, the network can maximally support the service characteristics of different terminals.

As described in the disclosure of the present specification, the terminal may perform access to the network. The terminal may receive (or transmit) data from an application (e.g., an application executed by the terminal). The terminal may be instructed that the data is specially processed data (e.g., exception data) together with data from the application. In this case, the terminal may check whether transmission of specially processed data is allowed from the network. When the terminal is allowed to transmit specially processed data from the network, the terminal may check whether the terminal is staying in a cell (e.g., an NB-IoT cell) related to transmission of the special processing data. When the terminal determines that the terminal is staying in a cell related to the transmission of the special processing data, the terminal may select an access category (e.g., AC 10) related to the transmission of the special processing data. The terminal may determine whether access is possible (e.g., perform an access control check) according to the selected access category. According to the determination of whether access is possible, the terminal may transmit data to the network.

For reference, the operation of the terminal (e.g., UE) described in this specification may be implemented by the apparatus of FIGS. 10 to 14 to be described below. For example, the terminal (e.g., UE) may be the first device 100*a* or the second device 100*b* of FIG. 11. For example, an operation of a terminal (e.g., UE) described herein may be processed by one or more processors 1020*a* or 1020*b*. The operation of the terminal described in this specification may be stored in one or more memories 1010*a* or 1010*b* in the form of an instruction/program (e.g. instruction, executable code) executable by one or more processors 1020*a* or 1020*b*. One or more processors 1020*a* or 1020*b* control one or more memories 1010*a* or 1010*b* and one or more transceivers 1031*a* or 1031*b*, and execute instructions/programs stored in one or more memories 1010*a* or 1010*b* as disclosed herein, thereby perform the operation of the terminal (e.g., UE) described in the disclosure of the present specification.

In addition, instructions for performing an operation of a terminal (e.g., a UE) described in the disclosure of the present specification may be stored in a non-volatile computer-readable storage medium in which it is recorded. The storage medium may be included in one or more memories 1010*a* or 1010*b*. And, the instructions recorded in the storage medium may be executed by one or more processors 1020*a* or 1020*b* to perform the operation of the terminal (e.g., a UE) described in the disclosure of the present specification.

For reference, the operation of a network node (e.g., AMF, UDM, PCF, etc.) or a base station (e.g., NG-RAN, gNB, gNB (NB-IoT), gNB (NR) eNB, RAN, etc.) described in this specification will be may be implemented by the apparatus described below in FIGS. 10 to 16. For example, the network node (eg, AMF, UDM, PCF, etc.) or a base station (e.g., NG-RAN, gNB, gNB (NB-IoT), gNB (NR) eNB, RAN, etc.) may be the first device 100*a* or the second device 100*b* of FIG. 11. For example, the operation of the network node (e.g., AMF, UDM, PCF, etc.) described herein may be processed by one or more processors 1020*a* or 1020*b*. The operations of the network node or base station described herein may be stored in one or more memories 1010*a* or 1010*b* in the form of instructions/programs (e.g. instruction, executable code) executable by one or more processors 1020*a* or 1020*b*. One or more processors 1020*a* or 1020*b* control one or more memories 1010*a* or 1010*b* and one or more transceivers 1031*a* or 1031*b*, and may perform the operation of the network node (e.g., AMF, UDM, PCF, etc.) or the base station (e.g., NG-RAN, gNB, gNB (NB-IoT), gNB (NR) eNB, RAN, etc.) described in the disclosure of the present specification by executing instructions/programs stored in one or more memories 1010*a* or 1010*b* as disclosed herein.

In addition, the instructions for performing the operation of the network nodes described in the disclosure of this specification (e.g., AMF, UDM, PCF, etc.) or a base station (e.g., NG-RAN, gNB, gNB (NB-IoT), gNB (NR) eNB, RAN, etc.) may be stored in a non-volatile computer-readable storage medium recording. The storage medium may be included in one or more memories 1010*a* or 1010*b*. And, the instructions recorded in the storage medium are executed by one or more processors 1020*a* or 1020*b* to perform operations of the network node (e.g., AMF, UDM, PCF, etc.) or base station (e.g., NG-RAN, gNB, gNB (NB-IoT), gNB (NR) eNB, RAN, etc.) described in the disclosure of the present specification.

III. Examples to which the Disclosure of the Present Specification Applies

Although not limited thereto, the various descriptions, functions, procedures, suggestions, methods, and/or operational flowcharts of the disclosure of the present specification disclosed in this document may be applied in various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 10:
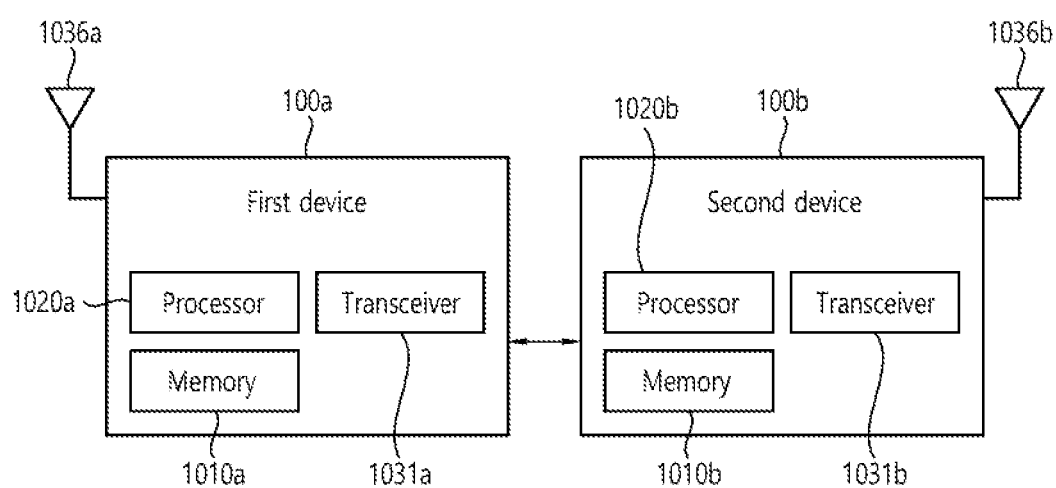
FIG. 10 illustrates a wireless communication system according to an embodiment.

FIG. 10 illustrates a wireless communication system according to an embodiment.

Referring to FIG. 10, the wireless communication system may include a first device 100*a* and a second device 100*b*. The first device 100*a* and the second device 100*b* may be wireless communication devices capable of performing wireless communication.

The first device 100*a* may be a UE described in the disclosure of the present specification. Or, the first device 100*a* may be a base station, a network node (e.g. SMF #1, AMF #1, UPF #1, SMF #2, AMF #2, UPF #2, MME #1, SGW #1, PGW #1, MME #2, SGW #2, PGW #2, etc.), a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g. SMF #1, AMF #1, UPF #1, SMF #2, AMF #2, UPF #2, MME #1, SGW #1, PGW #1, MME #2, SGW #2, PGW #2, etc.) described in the disclosure of the present specification. Or, the second device 100*b* may be a base station, a network node, a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (POS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 11:
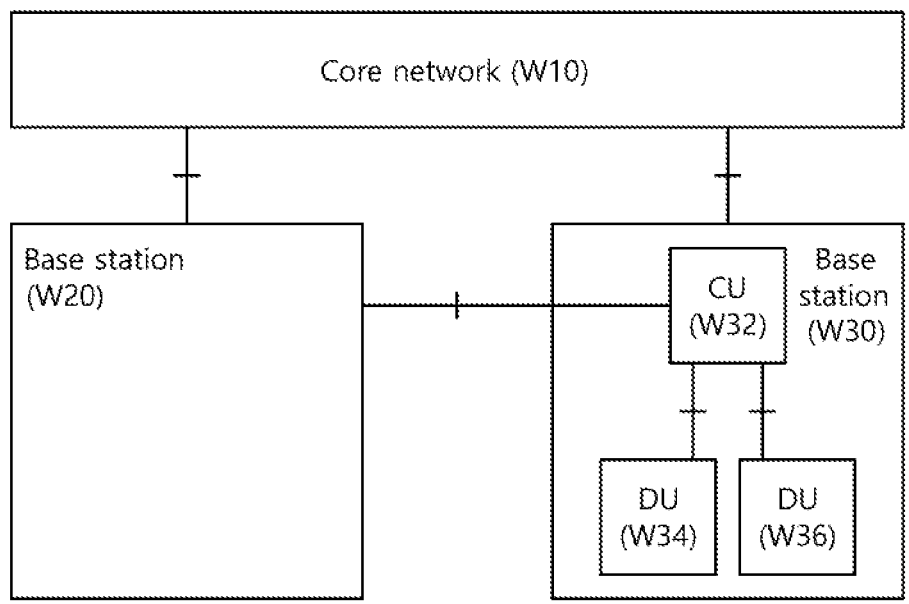
FIG. 11 illustrates a block diagram of a network node according to an embodiment.

FIG. 11 illustrates a block diagram of a network node according to an embodiment.

In particular, FIG. 11 is a diagram illustrating in detail a case in which a base station is divided into a Central Unit (CU) and a Distributed Unit (DU).

Referring to FIG. 11, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 12:
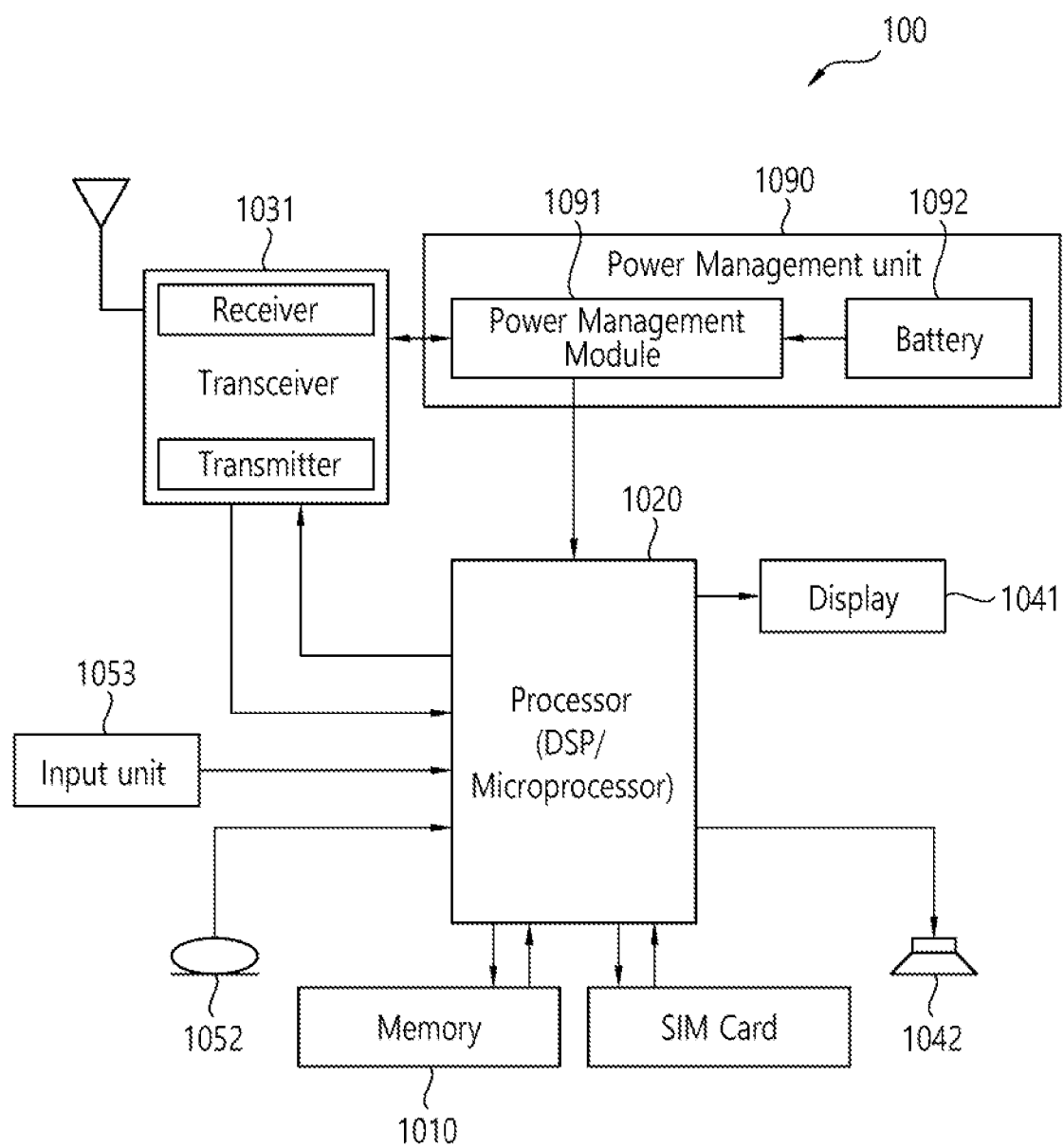
FIG. 12 is a block diagram illustrating a configuration of a UE according to an embodiment.

FIG. 12 is a block diagram illustrating a configuration of a UE according to an embodiment.

In particular, the UE 100 shown in FIG. 12 is a diagram illustrating the first device of FIG. 10 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 13:
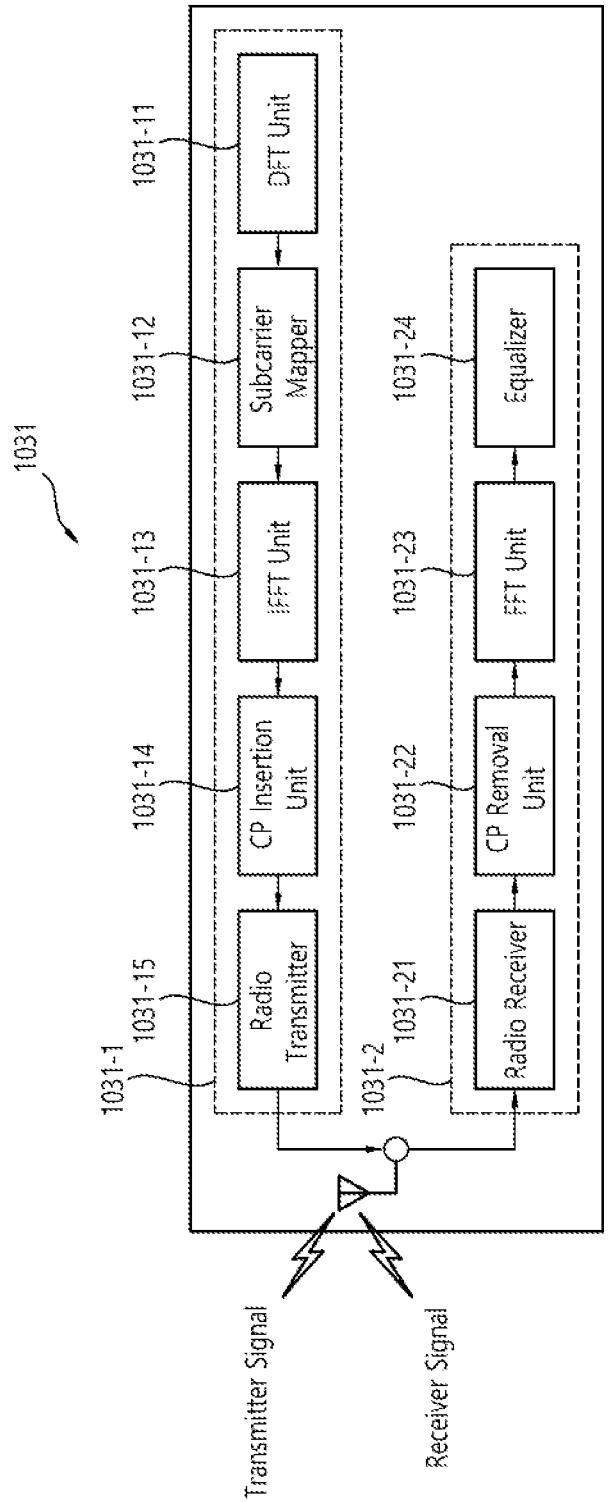
FIG. 13 is a detailed block diagram illustrating the transceiver of the first device shown in FIG. 10 or the transceiver of the device shown in FIG. 12 in detail.

FIG. 13 is a detailed block diagram illustrating the transceiver of the first device shown in FIG. 10 or the transceiver of the device shown in FIG. 12 in detail.

Referring to FIG. 13, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Figure 14:
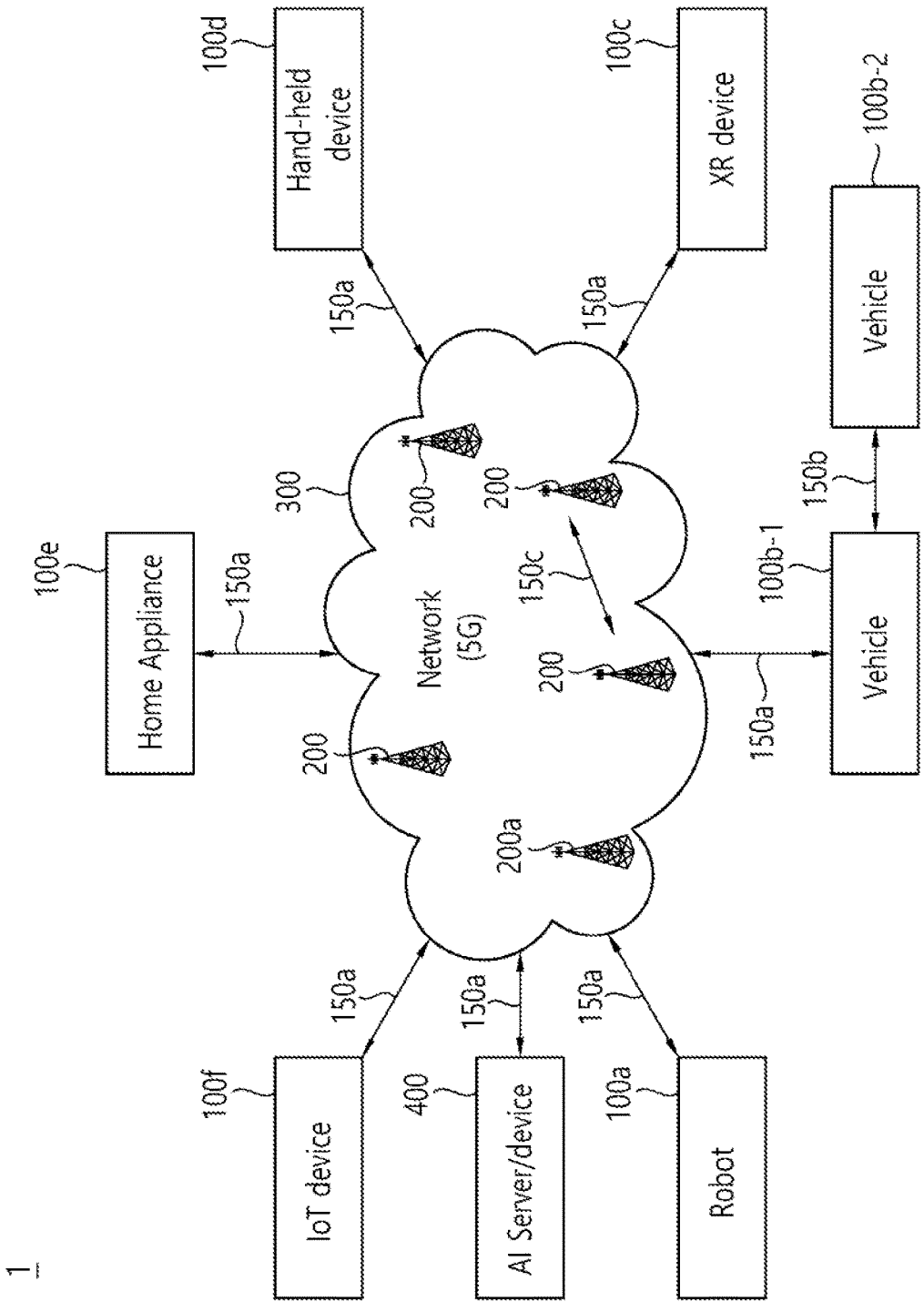
FIG. 14 illustrates a communication system 1 applied to the disclosure of the present specification.

FIG. 14 illustrates a communication system 1 applied to the disclosure of the present specification.

Referring to FIG. 14, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an extended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

Here, the wireless communication technology implemented in the wireless devices 100a to 100f, 400, and 100 and 200 of FIG. 11 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100a to 100f, 400, 100 and 200 in FIG. 11 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100a to 100f, 400, and 100 and 200 of FIG. 11 of the present specification may include at least any one of ZigBee, Bluetooth, and low-power wide area network (Low) in consideration of low-power communication. Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method for performing communication related to access control, the method performed by a user equipment (UE) and comprising:

obtaining information related to exception data:
determining an access category of an access attempt for the exception data, based on information related to the exception data:
performing an access control check, based on the determined access category; and
transmitting the exception data, if access is allowed according to the access control check:
wherein the access category is determined to be an access category 10 based on the information related to the exception data being information that the use of the exception data is allowed for the UE.

2. The method of claim 1,
wherein the access category 10 is not used, based on the information related to the exception data being information that the use of the exception data is not allowed for the UE.

3. The method of claim 1, further comprising:
transmitting a message requesting the provision of information related to the exception data.

4. The method of claim 3,
wherein the information related to the exception data is received by being included in a response message to the request message.

5. The method of claim 1,
wherein the UE is a UE supporting a Narrowband (NB)-Internet on Things (IoT).

6. The method of claim 5,
wherein the access category is determined to be an access category 10, based on that the UE is the UE supporting the NB-IoT, the UE is connected to an NB-IoT cell, and the information related to the exception data is information that the use of the exception data is allowed for the UE.

7. A method for performing communication related to access control, the method performed by a network node and comprising:
receiving a registration request message including information requesting to allow use of exception data from User Equipment (UE);
determining to allow the UE to use the exception data, based on subscription information of the UE and policy information to be applied to the UE; and
transmitting a registration response message including information that the use of the exception data is allowed to the UE:
wherein the information that the use of the exception data is allowed is used when the UE determines an access category of an access attempt for the exception data.

8. The method of claim 7, further comprising:
obtaining the subscription information of the UE from a Unified Data Management (UDM) node, based on that the registration request message is received.

9. The method of claim 7, further comprising:
obtaining the policy information to be applied to the UE from a Policy Control Function (PCF) node, based on that the registration request message is received.

10. A User Equipment (UE) for performing communication related to access control, the UE comprising:
at least one processor; and
at least one memory storing instructions and operably electrically connectable with the at least one processor,
wherein the operations performed based on the execution of the instructions by the at least one processor include:
obtaining information related to exception data:
determining an access category of an access attempt for the exception data, based on information related to the exception data:
performing an access control check, based on the determined access category; and
transmitting the exception data, if access is allowed according to the access control check;
wherein the access category is determined to be an access category 10 based on the information related to the exception data being information that the use of the exception data is allowed for the UE.

11. The method of claim 10,
wherein the UE is an autonomous driving device that communicates with at least one of a mobile terminal, a network, and an autonomous vehicle other than the UE.

* * * * *